(12) United States Patent
Bacastow

(10) Patent No.: US 9,159,061 B2
(45) Date of Patent: *Oct. 13, 2015

(54) METHOD AND SYSTEM FOR SECURING PAYMENT TRANSACTIONS

(71) Applicant: Collective Dynamics LLC, Cumming, GA (US)

(72) Inventor: Steven V. Bacastow, Cumming, GA (US)

(73) Assignee: COLLECTIVE DYNAMICS LLC, Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,160

(22) Filed: Sep. 24, 2013

(65) Prior Publication Data

US 2014/0025580 A1    Jan. 23, 2014

Related U.S. Application Data

(63) Continuation of application No. 12/390,003, filed on Feb. 20, 2009, now Pat. No. 8,577,804.

(60) Provisional application No. 61/066,416, filed on Feb. 20, 2008, provisional application No. 61/050,724, filed on May 6, 2008, provisional application No. 61/130,306, filed on May 29, 2008, provisional application No. 61/190,743, filed on Sep. 2, 2008, provisional application No. 61/191,293, filed on Sep. 8, 2008.

(51) Int. Cl.
| | | |
|---|---|---|
| *G06Q 20/32* | (2012.01) | |
| *G06Q 20/40* | (2012.01) | |
| *G06Q 20/02* | (2012.01) | |
| *G06Q 20/26* | (2012.01) | |
| *G06Q 20/34* | (2012.01) | |
| *G06Q 20/42* | (2012.01) | |

(52) U.S. Cl.
CPC ............ *G06Q 20/322* (2013.01); *G06Q 20/027* (2013.01); *G06Q 20/26* (2013.01); *G06Q 20/356* (2013.01); *G06Q 20/40* (2013.01); *G06Q 20/4012* (2013.01); *G06Q 20/425* (2013.01)

(58) Field of Classification Search
CPC ...................... G06Q 20/0425; G06Q 20/4012
USPC ......................................................... 705/28
See application file for complete search history.

(56) References Cited

U.S. PATENT DOCUMENTS

| | | |
|---|---|---|
| 5,590,038 A | 12/1996 | Pitroda |
| 5,884,271 A | 3/1999 | Pitroda |
| 6,925,439 B1 | 8/2005 | Pitroda |
| 7,308,426 B1 | 12/2007 | Pitroda |
| 7,526,652 B2 | 4/2009 | Ziegler |

(Continued)

OTHER PUBLICATIONS

Gamble, Richard H., PINning Hopes on e-Commerce Debit, Transaction Trends, Nov. 2010, pp. 18-20.

*Primary Examiner* — Shay S Glass

(74) *Attorney, Agent, or Firm* — King & Spalding LLP

(57) ABSTRACT

A method for facilitating the widespread use of the PIN-Debit payment method for Internet "eCommerce" and mobile payments sales which requires little or no change for the cardholders, merchants, debit networks and card issuers based primarily on the introduction of a layer of middleware and wherein the Debit Networks and Issuing Banks may customize the implementation of the services based on individual strategy and cardholder preferences.

13 Claims, 18 Drawing Sheets

Internet Commerce Overview
(card not present transaction)

Note: Prior art eCommerce does not support debit card Pin numbers to be input into online shopping carts without significant changes, special software or equipment.

(56) References Cited

U.S. PATENT DOCUMENTS

| | | |
|---|---|---|
| 7,552,094 B2 | 6/2009 | Park et al. |
| 8,577,804 B1 * | 11/2013 | Bacastow ................ 705/44 |
| 2002/0077978 A1 | 6/2002 | O'Leary et al. |
| 2003/0115126 A1 | 6/2003 | Pitroda |
| 2004/0044739 A1 | 3/2004 | Ziegler |
| 2005/0203843 A1 | 9/2005 | Wood et al. |
| 2005/0247777 A1 | 11/2005 | Pitroda |
| 2005/0250538 A1 | 11/2005 | Narasimhan et al. |
| 2006/0255128 A1 | 11/2006 | Johnson et al. |
| 2006/0287965 A1 | 12/2006 | Bajan |
| 2007/0005514 A1 * | 1/2007 | Fieschi et al. ............ 705/72 |
| 2007/0175978 A1 | 8/2007 | Stambaugh |
| 2007/0198432 A1 | 8/2007 | Pitroda |
| 2007/0203715 A1 | 8/2007 | Kane |
| 2007/0203850 A1 * | 8/2007 | Singh et al. ............ 705/67 |
| 2007/0288392 A1 | 12/2007 | Peng et al. |
| 2008/0082452 A1 | 4/2008 | Wankmueller et al. |
| 2008/0091616 A1 | 4/2008 | Helwin et al. |
| 2008/0114659 A1 | 5/2008 | Pitroda |
| 2008/0177826 A1 | 7/2008 | Pitroda |
| 2009/0254440 A1 | 10/2009 | Pharris |

* cited by examiner

Figure 2 - Legacy Pin Debit POS Processing
(card present transaction)

Figure 3 – High Level Overview

Figure 5 – Debit Network Configuration

Figure 7 – Cardholder Settings

Figure 8.0 – Merchant Settings

Figure 9.0 – Gateway and Acquirer Settings

Figure 10.0 – Processor Settings

Figure 11 – Secure Pin Debit Data Flow Diagram

Figure 12 – Mobile Secure Pin Debit Data Flow Diagram

Figure 13 – Secure Pin Debit Service Data Flow Diagram
(expanded figure 11.4)

Figure 14 – Apply Payment Settings Data Flow Diagram
(expanded figure 13.3)

Figure 16 – Secure PIN Debit Computing Device

Figure 17 – Mobile Internet Payment Data Flow Diagram

METHOD AND SYSTEM FOR SECURING PAYMENT TRANSACTIONS

RELATED APPLICATION APPLICATIONS

This application is a continuation of and claims priority to U.S. patent application Ser. No. 12/390,003, filed Feb. 20, 2009, and titled "Method and System for Securing Payment Transactions," which claims the benefit of priority of the following U.S. provisional applications:

| Application No. | Filed On |
| --- | --- |
| 61/066,416 | Feb. 20, 2008 |
| 61/050,724 | May 6, 2008 |
| 61/130,306 | May 29, 2008 |
| 61/190,743 | Sep. 2, 2008 |
| 61/191,293 | Sep. 8, 2008 |

The content of the foregoing applications is hereby fully incorporated herein by reference.

COPYRIGHT NOTICE

A portion of the disclosure of this patent document may contain material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

This invention relates to payment transactions involving PIN Debit cards and, more particularly, to systems and methods for processing PIN Debit transactions without a PIN pad or similar input device. The systems and methods herein may also be applied to forms of payment other than PIN Debit.

BACKGROUND OF THE INVENTION

There are two primary types of debit cards in use today for consumer purchases in the US: signature debit and PIN debit. The following is a brief overview of each:

A signature debit card typically carries a Visa or MasterCard brand and is generally accepted as a form of payment at any location that accepts the Visa or MasterCard Credit Cards. These Signature Debit transactions utilize the infrastructure provided by the major Credit Card networks (such as Visa, MasterCard) and utilize a two-step process which includes an authorization step followed by a settlement step. Signature debit cards issued from the major networks are accepted at the vast majority of physical merchants and eCommerce merchants. No special equipment is required for merchants to accept signature-debit cards beyond the equipment already in place to process credit cards; however, a signature from the cardholder is required. Conversely, signatures are neither supported nor required for online purchases made with these signature-debit cards. As a result of the increased potential for fraud, online merchants pay a higher fee for accepting these "card not present" transactions.

A PIN Debit card payment transaction, by contrast, presently requires a special type of equipment that is used to securely capture and store the cardholder personal identifying number ("PIN"). A PIN is typically a string of numbers and/or other characters that serve as a confidential code associated with a cardholder's account. An encrypted PIN pad is attached to the merchant's point of sale ("POS") terminal. When prompted, the cardholder enters the secret PIN using the encrypted PIN pad. Using the hardware, CPU and circuitry of the encrypted PIN pad, the cardholder PIN number is then encrypted and stored as a field (e.g. PIN Block) within a record of the payment transaction. PIN Debit transactions are received and processed by the debit networks using proprietary systems which are physically different and separate from the signature debit networks. PIN Debit cards carry the advantages of additional security for cardholders and lower fraud and acceptance costs for merchants. However, because of the requirement to securely capture and store the cardholder PIN number, PIN Debit has not been broadly adopted for online, eCommerce sales, such as those conducted via the Internet.

So, whereas signature debit is widely accepted and used in connection with eCommerce sales, PIN-based debit does not enjoy the same level of acceptance. There is little penetration of the PIN-Debit payment method for eCommerce sales as a result of PIN-Debit Network rules, concerns about the protection of the cardholder PIN, and limitations related to the current payment-processing methods. These factors combine to make it problematic to easily allow an Internet merchant to accept a PIN-Debit Card as a form of payment. In order to overcome these limitations of the current art, the present invention relates to methods and systems for enabling the broad use of PIN Debit as a payment method for secure Internet "eCommerce" sales.

Consumer research indicates that many cardholders prefer to use PIN-based debit over other forms of payment. As the cost of payment acceptance continues to rise, fraud related to eCommerce transactions is also a growing concern for online merchants, acquirers, and issuers. Online merchants would benefit from lower fraud and lower acceptance costs related to the PIN-based Debit form of electronic payments. However, as a result of limitations in methods surrounding the use and protection of cardholder PINs this payment type is not widely accepted for eCommerce. As consumer spending shifts away from the physical point of sale to the Internet, the PIN-Debit networks are at risk of losing market share and relevance to consumers and merchants alike.

Another emerging payment trend is related to the expected growth of mobile payments at the physical point of sale whereby the cardholder uses a "mobile wallet" in lieu of a physical wallet to digitally store and access payment instruments from a PDA or mobile phone. As with eCommerce sales, security requirements surrounding the protection of the cardholder's Debit Card PIN number, are likely to slow down or prevent the widespread use of PIN-Debit from mobile wallet payments. Furthermore, because banks prefer the more profitable signature payment methods the card issuing banks may not encourage PIN-Debit to be supported in bank-approved mobile wallets. If not addressed now, these trends represent a potential for significant erosion of transaction volumes for the PIN-Debit networks.

Rules regarding PIN-Debit transactions are governed by the major domestic PIN-Debit networks (e.g. PULSE, Star, NYCE, Accel-Exchange, Shazam). Although rules vary somewhat between networks, the networks are in agreement with respect to the need for high security over the personal identification number or PIN. In order to protect these PIN numbers from accidental or malicious disclosure, stringent hardware-based encryption is mandated at the point-of-sale locations that accept these PIN-based Debit cards. After entry, the cardholder's PIN number is encrypted and securely stored within an Encrypted PIN Block (EPB) within the payment transaction record. This cardholder PIN number is herein referred to as the "Physical PIN". Because of a lack of adequate security measures for protecting the Physical PIN in eCommerce transactions, network rules generally prohibit the use of PIN-Debit cards for general eCommerce sales.

Furthermore, because the typical data set accepted by a merchant's eCommerce site is different from the data set that a PIN-Debit Network would typically receive from a physical point-of-sale device, a significant amount of change is required in order to facilitate the widespread use of PIN-Debit for eCommerce sales.

Examples of the state of the prior art for processing eCommerce and point-of-sale (POS) transactions are illustrated in FIGS. 1 and 2. Referring to FIG. 1, a Cardholder (1.0), sits at a PC and enters Cardholder Data (1.0.1) required by the Merchant Shopping Cart (1.1). Cardholder Data typically includes the Primary Account Number (PAN), name, address, email address, ship to address and other related fields. Most merchant shopping carts also require the entry of the CVV2 security code along with other Cardholder Data. Its method consists of requiring a cardholder to enter the CVV2 number in at transaction time to verify that the card is on hand. The CVV2 code is a security feature for "card not present" transactions (e.g., Internet transactions), and now appears on most (but not all) major credit and debit cards. According to Wikipedia "The CVV2 is a 3- or 4-digit value printed on the card or signature strip, but not encoded on the magnetic stripe".

The Merchant Shopping Cart (1.1) and underlying payment software are software typically hosted by the Merchant in connection with its website. The Merchant Shopping Cart (1.1) and payment software format the payment transaction and forward the payment transaction including the cardholder data (1.1.1) to the Gateway or Acquirer (1.2). The Gateway is defined herein as an intermediary that is often involved in processing eCommerce payment transactions. The Gateway can connect the Merchant to the Acquirer. The Gateway may also provide value added services such as fraud controls, support for recurring payments, online reporting, and virtual terminal data entry. The Gateway ultimately forwards the transaction to the Acquirer. The Acquirer typically has a contractual relationship with the Merchant for the purpose of processing payment transactions and deposits the net proceeds for each day's sales into the Merchant bank account. In some cases a single entity serves both the role of Gateway and Acquirer.

The Acquirer (1.2) reformats the record comprising the transaction in accordance with network requirements and forwards the ISO 8583 (1.3) formatted transaction to the Credit Card Networks (1.4). For definition purposes, and according to the Wikipedia, "The vast majority of transactions made at Automated Teller Machines use ISO 8583 at some point in the communication chain, as do transactions made when a customer uses a card to make a payment in a store. In particular, both the MasterCard and Visa networks base their authorization communications on the ISO 8583 standard, as do many other institutions and networks. Cardholder-originated transactions include purchase, withdrawal, deposit, refund, reversal, balance inquiry, payments and inter-account transfers. ISO 8583 also defines system-to-system messages for secure key exchanges, reconciliation of totals, and other administrative purposes. Although ISO 8583 defines a common standard, it is not typically used directly by systems or networks. Instead, each network adapts the standard for its own use with custom fields and custom usages".

The Credit Card Network (1.4) receives the ISO 8583 payment transaction and forwards it (1.4.1) to the card issuing bank or Issuer (1.5). The Issuer determines whether the cardholder has sufficient credit or available funds to complete the purchase and sends a response message (1.5.1) back to the Card Network (1.4). The transaction path is traversed until the response message is received by the Merchant. As shown by element 1.4, the PIN Debit Networks are not represented in the list of available networks for credit card and signature debit payment acceptance. This is primarily a result of the fact that the prior art does not support the secure entry of Physical PIN numbers into Merchant Shopping carts without requiring significant changes to the existing networks.

FIG. 2.0 illustrates prior art for processing payment transactions at the physical point-of-sale (POS), as opposed to an on-line transaction as illustrated in FIG. 1. Referring to FIG. 2, a Cardholder (1.0) uses a physical card that provides data (2.0.1), typically via a magnetic strip, to the Merchant POS System (2.1). The Merchant POS System reads the data from the card and determines from the Primary Account Number (PAN) that the card is related to a PIN Debit Network and then prompts the Cardholder (1.0) to enter the Physical PIN (2.0.2) into the PIN Pad (2.1.1). The Physical PIN Number is encrypted by the PIN Pad and passed to the Merchant POS System for insertion into the payment transaction Encrypted PIN Block. The Merchant POS System (2.1) forwards the Payment Transaction including the cardholder data (2.1.1) and the Encrypted PIN Block (2.1.2) to the Acquirer (2.2).

The Acquirer further formats the transaction and forwards the ISO 8583 transaction (2.3) to the Debit Network (2.4). These Debit Networks include organizations such as (STAR, PULSE, NYCE) and others. The Debit Network (2.4) forwards the transaction (2.4.1) to the Issuer (2.5). The Issuer determines if there is sufficient funding available in the cardholder's account, validates the Physical PIN and returns a response code (2.5.1) to the POS.

It is important to note that this prior art does not support the entry of data elements into the Merchant POS System (2.1) that would be commonly supported by the Merchant Shopping Cart shown in FIG. 1.1). The data elements which are not supported include such information as: Cardholder address, CVV2 security code, email address, and other data typically required for eCommerce transactions.

As has been described above, there are differences in the systems, requirements and methods that are currently used to process online Signature Debit and POS based PIN-Debit payments. There are also differences in the formatted ISO 8583 transactions. The most notable differences being that the POS PIN-Debit transaction (2.1.1) includes the Encrypted PIN Block and the eCommerce transaction (1.1.1) includes the CVV2, cardholder address, and other data fields and specifically does not support the EPB.

In order to promote the use of PIN Debit for ecommerce sales, methods and systems have been proposed and developed with limited success. New methods have failed to attract cardholders, merchants, or networks as a result of their limitations. For example:

(i) Some current methods require the cardholder to install special software on their personal computer.
(ii) Other methods require the cardholder to purchase and, or install special equipment such as PIN pads or magnetic-stripe readers on personal computers.
(iii) Other methods require the cardholder to leave the merchant's eCommerce site when using the PIN-Debit payment method.
(iv) Still other methods require significant changes to merchant sites, transaction formats, and issuer authorization methods.

The widespread adoption of PIN-Debit payments for eCommerce transactions will be facilitated if the PIN can be securely processed in a simpler manner for the cardholders, merchants, payment gateways, networks, and issuing banks or their processors. Therefore, a need exists for a method which will overcome current limitations and lead to the widespread acceptance of PIN-Debit transactions for eCommerce (Internet Sales).

Another emerging risk for PIN-Debit Networks is related to the expected growth of mobile payments at the physical point-of-sale and for online payments. A mobile payment is best characterized as a payment made to a merchant that is facilitated by a payment instrument digitally stored in a mobile wallet. As in the case of a payment made at the physical point of sale, at checkout the cardholder is prompted by the mobile wallet application to select a payment method from among the cardholder's previously-stored payment instruments (e.g. credit card, signature debit, prepaid or gift card). The mobile wallet then prompts the cardholder to enter a "mobile wallet PIN number" and subsequently releases the selected payment type to the acquiring processor for authorization and settlement. Because PIN-Debit transactions made at the point of sale require an encrypted PIN pad for completion, using current methods, a PIN-Debit transaction would require a second Physical PIN number to be entered into the available POSPIN pad. Although possible, the entry of two PIN numbers for a single point-of-sale transaction would be considered slow and inefficient while detracting from the "mobile payment experience". Therefore, a method is needed that will enable the PIN-Debit payment to be supported by mobile wallet payments in such a way as to require only the "mobile wallet PIN number" to be entered by the cardholder.

SUMMARY OF THE INVENTION

The invention satisfies the above-described and other needs by providing systems and methods for processing PIN-debit transactions for eCommerce and point-of-sale purchases. The systems and methods described herein allow for processing PIN-debit transactions without significant modifications of existing Debit Network s, point-of-sale equipment, or eCommerce transaction sites such as websites.

In one exemplary embodiment, the invention provides a method for processing PIN-debit payments received at a website operated by a merchant. The merchant can receive the customer's account number and forward it to an acquirer computing device that determines whether the transaction is a PIN-debit transaction. If the transaction is a PIN-debit transaction, the acquirer computing device can forward the account number to a PIN-debit service computing device for processing. The PIN-debit service computing device can communicate with the customer via the customer's mobile telephone to obtain approval for the transaction. The PIN-debit service computing device can also insert the cardholder's Physical PIN associated with the PIN-debit account number and forward the transaction with the cardholder PIN to a Debit Network for processing.

In another exemplary embodiment, the invention provides a system for processing PIN-debit payments received at a website operated by a merchant. An acquirer computing device can receive a transaction record comprising a customer account number from the merchant. The acquirer computing device can determine whether the transaction record represents a PIN-debit transaction and, if so, forward the transaction record to a PIN-debit service computing device for processing. The PIN-debit service computing device can communicate with the customer via a mobile telephone to obtain authorization for the transaction. The PIN-debit service computing device can also insert into the transaction record the cardholder's Physical PIN associated with the account number and forward the augmented transaction record to a Debit Network for processing.

In yet another exemplary embodiment, the invention comprises a method for processing a PIN-debit transaction at a point-of-sale. A point-of-sale device can receive a cardholder's mobile payment account number from the cardholder's mobile telephone and forward the mobile payment account number in a transaction record to an acquirer for processing. The acquirer can forward the transaction record with the mobile payment account number to a PIN-debit service computing device which comprises a mobile wallet system. The mobile wallet system can request a payment method from the customer via the cardholder's mobile telephone. If the cardholder selects a PIN-debit payment method, the PIN-debit service computing device can exchange the mobile account number with the cardholder's primary debit account number and insert the cardholder's associated personal identification character string into the payment transaction. The PIN-debit service computing device can also forward the augmented transaction record including the personal identification string to a Debit Network for processing.

In yet another embodiment, the invention comprises a system for processing a PIN-debit transaction at a point-of-sale. The system comprises a point-of-sale device operable to receive a cardholder's mobile payment account number from a mobile telephone and to forward the mobile payment account number in a transaction record to an acquirer for routing to a PIN-debit service computing device. The PIN-debit service computing device can comprise a mobile wallet system for communicating with the cardholder's mobile telephone and obtaining a payment selection method from the cardholder. If the cardholder selects a PIN-debit payment method, the PIN-debit service computing device can substitute the cardholder's primary debit account number for the mobile account number and add the cardholder's personal identification character string to the transaction record. Once the transaction record has been updated, the PIN-debit service computing device can forward the transaction record to a Debit Network for processing.

In yet another embodiment, the invention comprises a system for processing a payment transaction at a merchant shopping cart. The system comprises a merchant shopping cart device operable to receive a cardholder's mobile payment account number from a mobile telephone and to forward the mobile payment account number in a transaction record to an acquirer for routing to a Mobile Wallet & PIN-debit service computing device. The Mobile Wallet & PIN-debit service computing device can comprise a mobile wallet system for communicating with the cardholder's mobile telephone and obtaining a payment selection method from the cardholder. If the cardholder selects a PIN-debit payment method, the PIN-debit service computing device can substitute the cardholder's primary debit account number for the mobile account number and add the cardholder's personal identification character string to the transaction record. If the cardholder selects a payment method other than PIN-debit payment method, the Mobile Wallet & PIN-debit service computing device can substitute the cardholder's primary account number for the mobile account number. Once the transaction record has been updated, the Mobile Wallet & PIN-debit service computing device can forward the transaction record to a Credit Card Network, Debit Card Network or alternate payment network for processing.

The foregoing exemplary embodiments and other embodiments will be discussed in greater detail in the Detailed

DETAILED DESCRIPTION OF THE EXEMPLARY EMBODIMENTS

The present invention answers these needs by providing a method for enabling the broad use of the PIN-Debit payment method for eCommerce and Mobile Wallet sales without requiring the cardholder to purchase or install special software or hardware on their PC, without requiring the merchant to make extensive changes to their eCommerce sites and without requiring the payment gateways, Debit Networks, card issuers or other stakeholders to make significant changes to their transaction authorization and settlement processes. The present invention also allows the participants to share a common infrastructure provided by the Secure PIN Debit Service (SPDS) for processing eCommerce and Mobile Wallet transactions while providing a basis for competitive differentiation.

Figure 5:
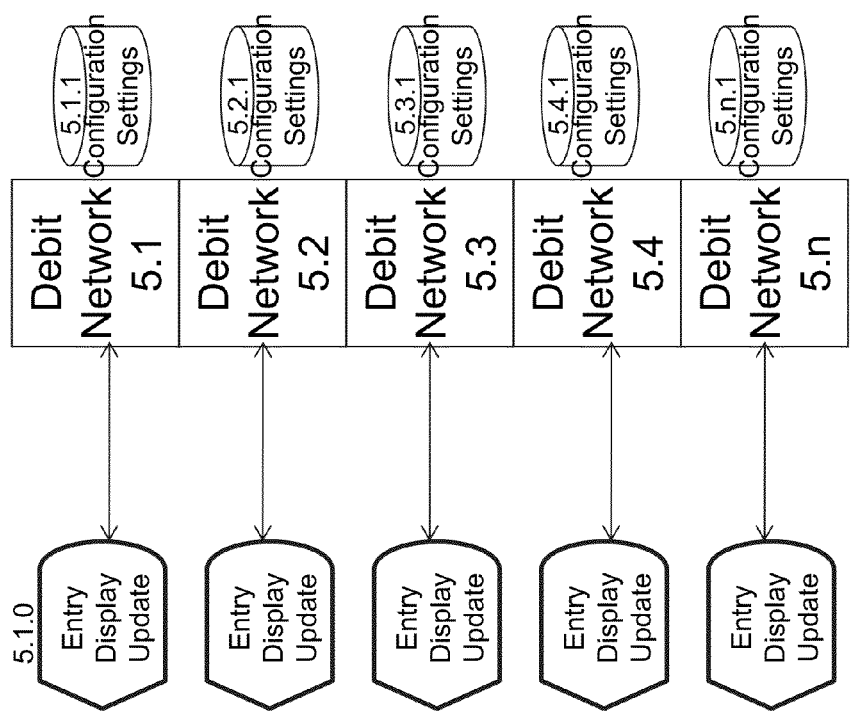
FIG. 5 illustrates an architecture for receiving and storing Debit Network configuration settings in accordance with an exemplary embodiment of the invention.

In embodiments of the present invention as illustrated in FIG. 5.0 each participating Debit Network will independently define and maintain a set of unique rules, preferences and settings which will serve as the "configuration settings" for the Debit Network. Configuration settings will be used by the SPDS to govern key aspects of transaction processing, define allowable card issuer functions and feature sets, and determine allowable cardholder functions and features while providing a basis for competitive differentiation. These settings are securely entered, displayed, and updated by authorized representatives of the Debit Network (5.1) using Terminal (5.1.0) to create or update Configuration Settings (5.1.1). At a minimum these settings would define the specific message format that the Debit Network mandates for payment transactions. Configuration Settings could also specify, for example, the type of merchants that are authorized to utilize the payment method as represented by the merchant's Standard Industrial Classification Code (SIC), Merchant Classification Code (MCC) code or other similar designation. Other configuration settings will relate to the specific method by which the Debit Network handles key encryption and other proprietary aspects of processing or message formats which would differentiate one Debit Network's (5.1) transaction processing requirements from another (e.g. 5.2). Still other configuration settings may relate to specific feature sets that the Debit Network will require or allow Issuers to implement. For example, Debit Network (5.1) may mandate that all cardholder transactions over a specific dollar amount require a secondary cardholder authorization based on an email notification while Debit Network (5.2) may allow issuers to make this determination.

Figure 6:
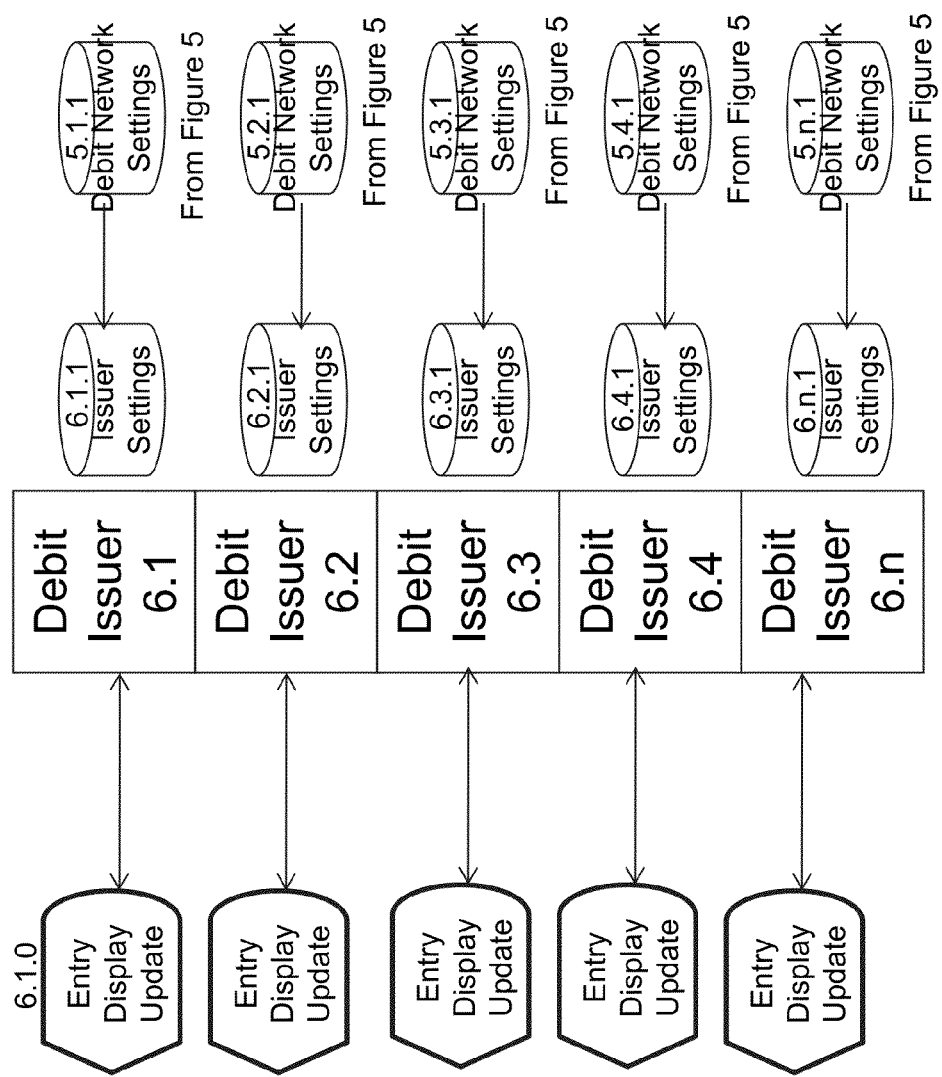
FIG. 6 illustrates an architecture for receiving and storing issuer configuration settings in accordance with an exemplary embodiment of the invention.

In other embodiments of the present invention as illustrated in FIG. 6.0, within the framework allowed by each Debit Network as specified in the Debit Network Configuration Settings, each participating Debit Issuer will independently define and maintain a set of unique rules, preferences and settings which will serve as the "Issuer Settings". Issuer settings will be used by the SPDS to govern key aspects of transaction processing, define the issuing bank's unique set of cardholder functions and features and provide a basis for competitive differentiation. These settings are securely entered, displayed, and updated by authorized representatives of the Debit Issuer (6.1) using Terminal (6.1.0) to create or update Issuer Settings (6.1.1). As shown, the set of Debit Issuer settings that are allowable are governed first and foremost by the Debit Network Configuration Settings. As shown for purpose of illustration Issuer Settings (6.1.1) are governed by Debit Network Settings (5.1.1) and Issuer Settings (6.3.1) are governed by Debit Network Settings (5.3.1). Issuer Configuration Settings specify, for example, the type of merchants that are authorized to utilize the PIN Debit payment method as represented by the merchant's Standard Industrial Classification Code (SIC), Merchant Classification Code (MCC) code or other similar designation. Other configuration settings will relate to the features that the Issuer wishes to make available to its Debit Cardholders. These settings may allow Cardholders to register Mobile Phone Number, specify standards for Mobile PIN Numbers, enable features that allow Debit Cardholders to create lists of approved or prohibited merchants, specify daily transaction limits, and other similar features. Finally, Debit Issuer settings will specify to the SPDS the specific method with which to obtain and protect their Cardholder's Physical PIN Number and the specific method with which to augment ISO 8583 payment transactions with the Encrypted PIN Block as discussed further in FIG. 15.

Figure 7:
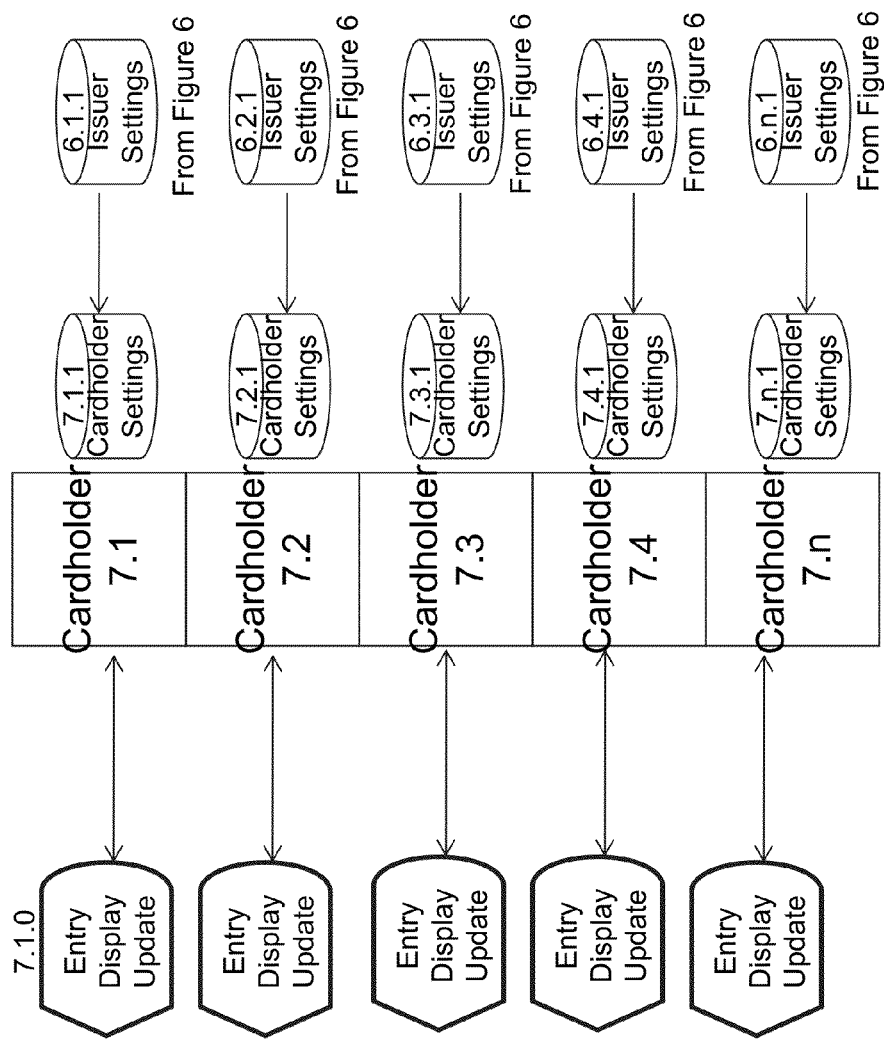
FIG. 7 illustrates an architecture for receiving and storing card holder configuration settings in accordance with an exemplary embodiment of the invention.

In other embodiments of the present invention as illustrated in FIG. 7.0, within the framework allowed by each Debit Issuer as specified in the Issuer Settings, each participating cardholder will independently define and maintain a set of unique rules, preferences and settings which will serve as the "Cardholder Settings" for their PIN Debit cards. Cardholder settings will be used by the SPDS to govern key aspects of transaction processing and control the behavior of cardholder's unique function and feature sets. These settings are securely entered, displayed, and updated by the Debit Cardholder (7.1) using Terminal (7.1.0) to create or update Configuration Settings (7.1.1). As shown, the set of Debit Cardholder settings that are allowable are governed by the Debit Issuer Configuration Settings. As shown for purpose of illustration Cardholder Settings (7.1.1) are governed by Issuer Settings (6.1) and Cardholder Settings (6.3.1) are governed by Issuer Settings (6.3.1). Cardholder Configuration Settings will allow Cardholders to register a single or multiple mobile phone numbers, specify a Mobile PIN Number based on Issuer standards, create lists of approved and prohibited merchants, specify daily transaction limits, specify primary and secondary email accounts and enable and configure other similar features which will combine to make each Debit Cardholder's experience unique while conforming to the standards mandated by the Issuer and Debit Network.

Figure 8:
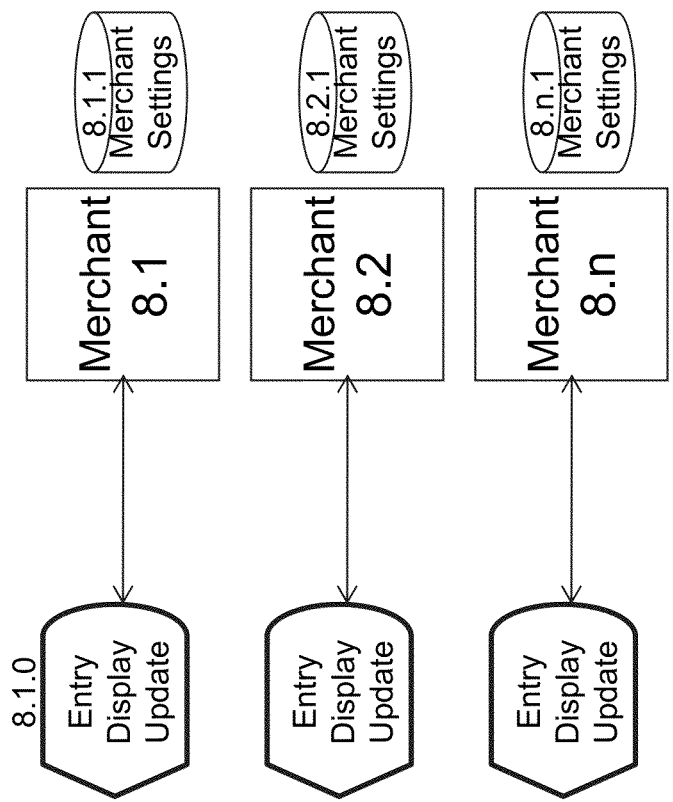
FIG. 8 illustrates an architecture for receiving and storing merchant configuration settings in accordance with an exemplary embodiment of the invention.

In other embodiments of the present invention as illustrated in FIG. 8.0, within the framework allowed by the governing rules established for the SPDS, each Merchant will independently define and maintain a set of unique rules, preferences and settings which will serve as the "Merchant Settings" related to processing PIN Debit cards. Merchant settings will be used by the SPDS to govern key aspects of transaction processing. As shown in FIG. 8, these settings are securely entered, displayed, and updated by an authorized representative of the Merchant (8.1) using Terminal (8.1.0) to create or update Merchant Settings (8.1.1). These settings would include all unique identifying information about a Merchant such as: Merchant Legal Name, Merchant Address, Tax Id Number, SIC Code, MCC Code, Merchant Id., Gateway processor, Acquirer, and other data that will be needed to correctly process and route the Merchant payment transactions.

Figure 9:
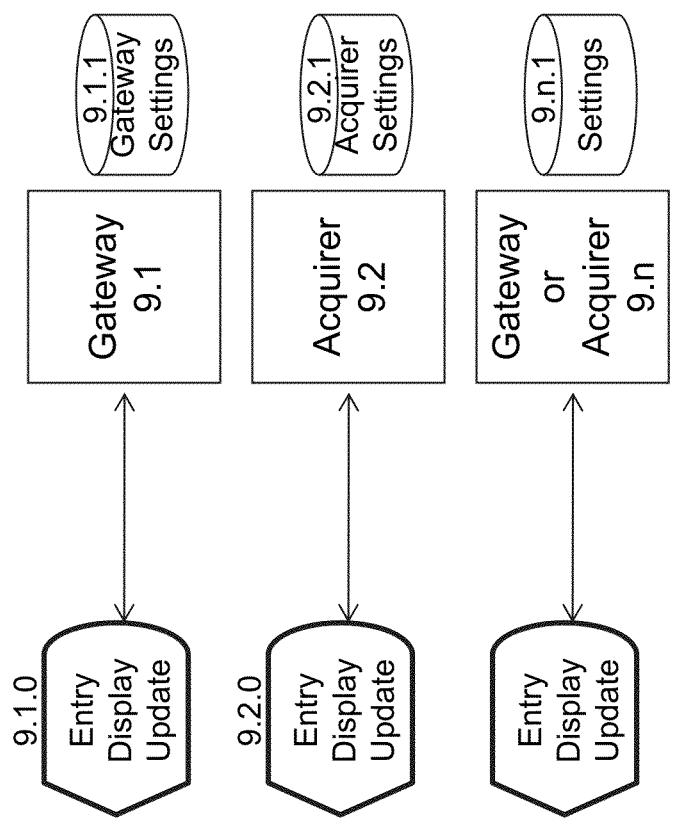
FIG. 9 illustrates an architecture for receiving and storing gateway and acquirer configuration settings in accordance with an exemplary embodiment of the invention.

In other embodiments of the present invention as illustrated in FIG. 9.0, within the framework allowed by the governing rules established for the SPDS, each Gateway and Acquirer will independently define and maintain a set of unique rules, preferences and settings which will serve as the "Gateway Settings" and "Acquirer Settings" related to processing PIN Debit cards. Gateway settings will be used by the SPDS to govern key aspects of transaction processing and provide a basis for competitive differentiation. As shown in FIG. 9, these Gateway settings are securely entered, displayed, and updated by an authorized representative of the Gateway (9.1) using Terminal (9.1.0) to create or update Gateway Settings (9.1.1). Similarly, Acquirer settings are securely entered, displayed, and updated by an authorized representative of the Acquirer (9.2) using Terminal (9.2.0) to create or update Gateway Settings (9.2.1). These settings would include specific message formatting requirements for payment transactions and specify other transaction processing options that are available only to Merchants using payment processing services offered by these entities.

Figure 10:
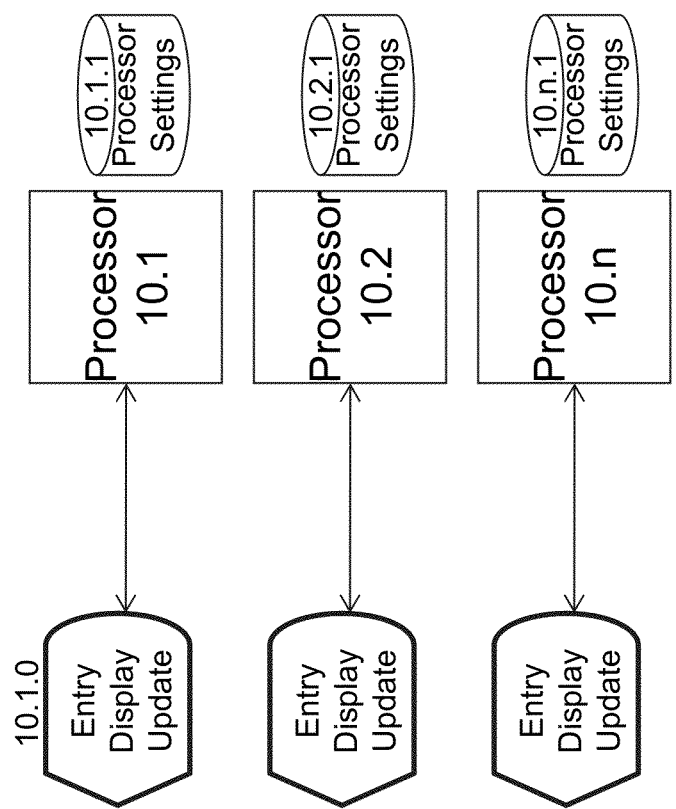
FIG. 10 illustrates an architecture for receiving and storing processor configuration settings in accordance with an exemplary embodiment of the invention.

In other embodiments of the present invention as illustrated in FIG. 10.0, within the framework allowed by the governing rules established for the SPDS, each Processor will independently define and maintain a set of unique rules, preferences and settings which will serve as the "Processor Settings" related to processing PIN Debit cards. Processor settings will be used by the SPDS to govern key aspects of transaction processing and provide a basis for competitive differentiation. As shown in FIG. 10, these Processor Settings are securely entered, displayed, and updated by an authorized representative of the Processor (10.1) using Terminal (10.1.0) to create or update Processor Settings (10.1.1). Processor Settings will define specific message formats for payment transactions, encryption requirements and other specifics related to how each processor uniquely handles payment transactions and PINS.

In accordance with the methods described above, configuration settings can be created for each participating Debit Network, Issuing Bank, Merchant, Processor, Gateway and Cardholder prior to use of the SPDS methods. Prior to using the SPDS system, each cardholder first registers their Debit card(s) and sets options in accordance with allowable ranges as prescribed by their Issuing Bank (e.g.—Purchase limits, daily limits, cell phone numbers, email accounts, lists of approved and prohibited merchants, etc.). Upon successful registration and configuration, the SPDS generates a unique Mobile PIN Number using a proprietary algorithm and based on the requirements and settings established. The Mobile PIN Number is provided to the Debit Cardholder at which point the Debit Cardholder makes a record of the number for subsequent use. The Mobile PIN Number is associated with the Debit Card PAN and can be restricted to use for eCommerce and Mobile Wallet purchases. An email, text message (or other suitable communication) is sent to the cardholder as a notification that the Mobile PIN Number has been generated or changed.

Figure 1:
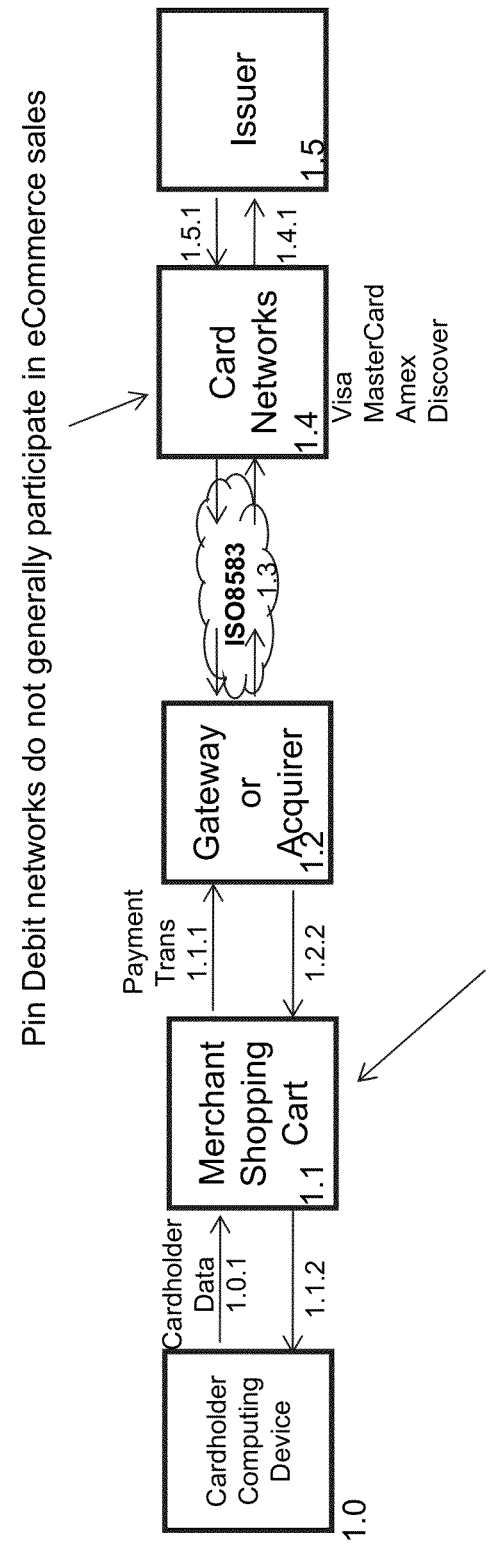
FIG. 1 illustrates an overview of a conventional eCommerce transaction.
Figure 2:
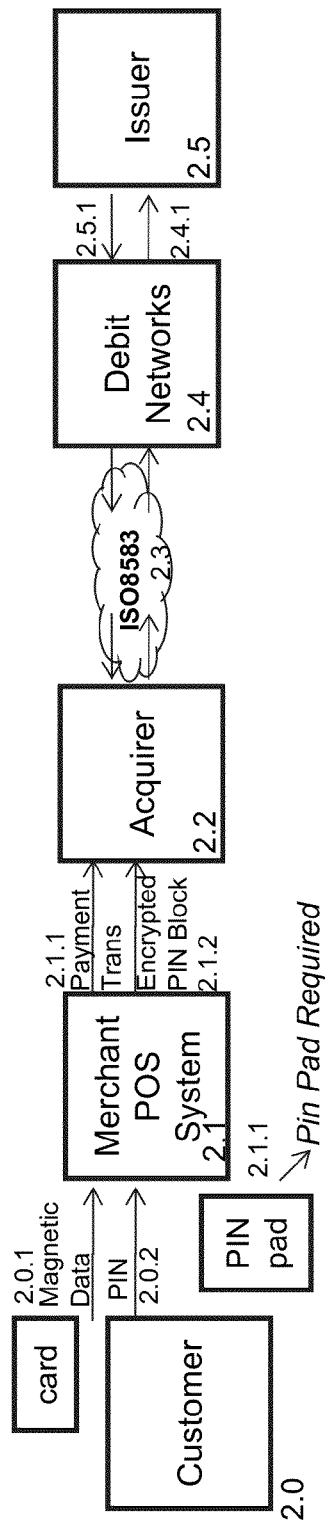
FIG. 2 illustrates an overview of a conventional point-of-sale transaction.
Figure 3:
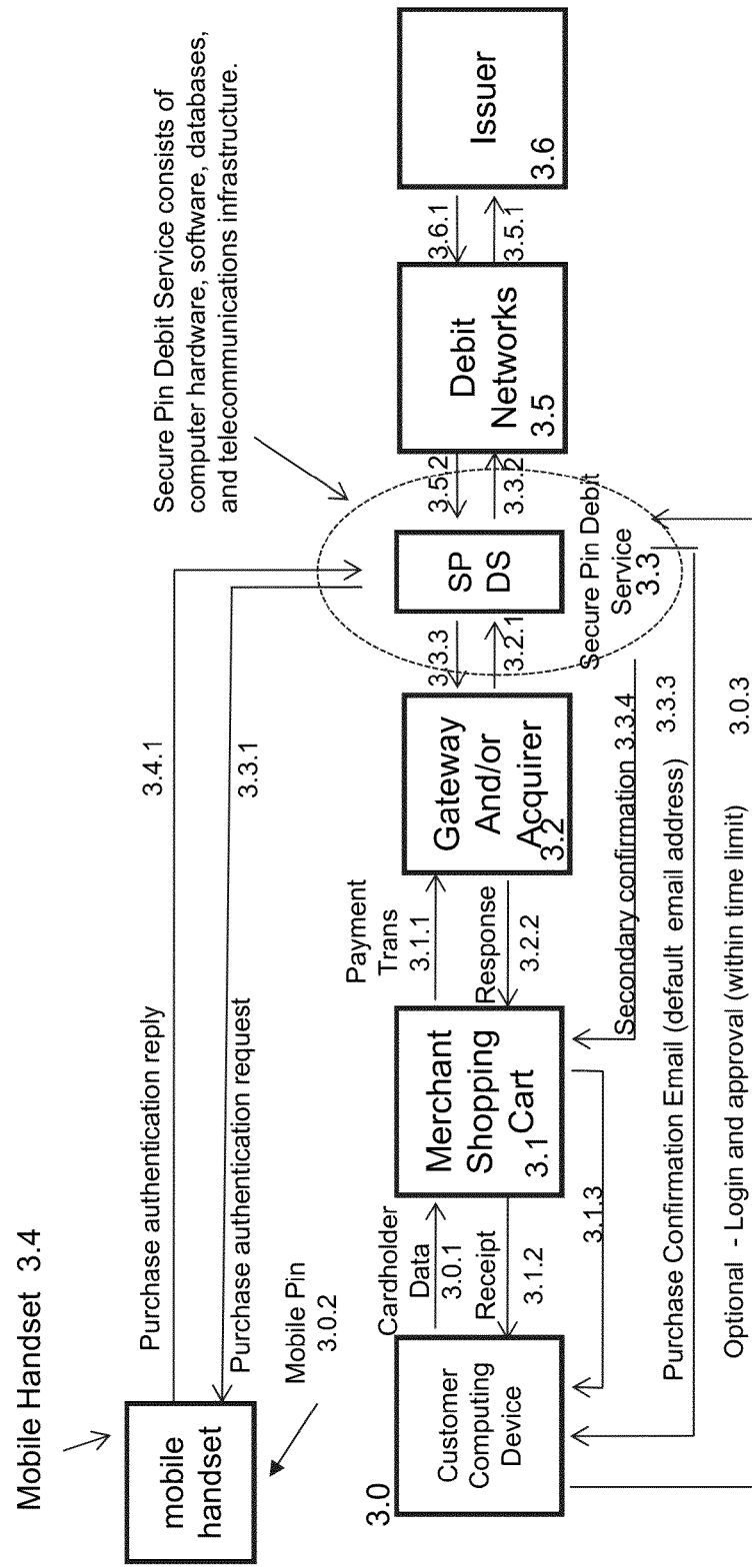
FIG. 3 illustrates an eCommerce transaction in accordance with an exemplary embodiment of the invention.

An embodiment of an online payment processed using an exemplary SPDS is illustrated in FIG. 3. It should be understood that in alternate embodiments of the invention the sequence of steps and entities performing the steps can be varied somewhat from what is shown in FIG. 3 without departing from the scope of the invention. As shown in FIG. 3, once a PIN Debit card has been registered with the SPDS the following exemplary sequence describes the use of the registered card number for an eCommerce transaction:

(i) The cardholder makes a purchase selection at an approved Merchant web site.

(ii) Cardholder then enters the required Cardholder Data (3.0.1) such as: name, card number, expiration date, address, and (if required, the cvv2 field) into the Merchant Shopping Cart (3.1). The Merchant Shopping Cart (3.1) formats a Payment Transaction (3.1.1) and forwards the transaction to the Gateway or Acquirer (3.2).

(iii) The Gateway or Acquirer (e.g. Chase, PayPal, Cybersource) acquires the transaction performs normal fraud and security checks including common eCommerce validations such as velocity checking (e.g. tracks the volume of payment transactions received from an IP address or payment card to detect possible fraud) and routes the ISO 8583 transaction (3.2.1) to the SPDS (3.3) for further processing.

(iv) The SPDS validates the transaction against the cardholder, issuer, merchant, and network rules in place. All cardholder preferences are invoked at this point. For example, the cardholders' account can be configured to automatically approve or cancel purchases based on certain characteristics and combinations of characteristics (e.g. approved and prohibited merchant lists, transaction size, etc.).

(v) For transactions which pass the above requirements the cardholder receives a Purchase Authentication Request communication (3.3.1) on the registered cell phone. Upon receipt of the communication the cardholder enters the Mobile PIN (3.0.2) to approve the purchase and submits the Purchase Authentication Reply (3.4.1) which is sent back to the SPDS.

(vi) It should be noted that there are multiple methods for sending this communication (3.3.1) to the phone and multiple methods for cardholder approval using the Mobile PIN (3.0.2) some of which are addressed in embodiments herein. For example:

(vii) A computer system may dial the registered cell phone and wait for the entry of the correct Mobile PIN number within an established timeframe, or (viii) An sms text message may be sent to the registered cell phone. A reply text message with the Mobile PIN would signify the approval of the sale, or (ix) A secure token can be released from the cell phone upon entry of the Mobile PIN, or (x) A Wireless Application Protocol (WAP) based message can be pushed to the registered phone prompting the cardholder to enter the Mobile PIN.

(xi) Other reasonable methods as identified by the practitioner skilled in the art may be developed for the purpose of entering and protecting the cardholder Mobile PIN and as a basis of competitive differentiation.

(xii) For those transactions which have been approved by the cardholder the Physical PIN (Alternate PIN (e.g. a pre-established PIN that has been registered with the Issuer for use only in eCommerce transactions) or a partial Physical PIN) may be inserted into the ISO 8583 transaction Encrypted PIN Block prior to routing the transaction (3.3.2) to the Debit Network (3.5). Typically, the Issuer would have registered the Physical PIN, Alternate PIN or partial Physical PIN with the SPDS in advance so that this step can be completed.

(xiii) Payment transactions (3.3.2) now having been augmented with the Physical PIN, Partial PIN or Alternate PIN are routed to the Debit Networks (3.5). Debit Networks perform all current fraud testing (e.g. neural network, stand in, etc.) on the transaction and then the Debit Networks route the transaction (3.5.1) to the Issuer (3.6) for approval.

(xiv) The Issuer (3.6) approves or declines the transaction based on existing capabilities and rules such as: cardholder balance, velocity and other standard validations such as daily limits, neural rules, etc. Therefore little or no change should be required of the Issuer or Issuer processor over current methods. However, as noted above, if a "Alternate PIN" was inserted into the transaction, the Issuer or Issuing Processor would be required to validate this PIN as part of the process.

(xv) The issuer (3.6) then sends response code (3.6.1) typically an authorization or decline associate with the payment transaction record (3.5.1) to the Debit Networks (3.5) which forward the response code (3.5.2) to the SPDS (3.3) which forwards the response code (3.3.3) to the Gateway and/or Acquirer (3.2) which forwards the response code (3.2.2) to the merchant shopping cart (3.1) and thus completing the transaction cycle.

(xvi) The Merchant receives a response code (3.2.2) and the cardholder gets a receipt (3.1.2) and confirmation email (3.1.3) from the Merchant. As an optional step and based on the requirements of the Issuer and Debit Networks, the cardholder may also receive a confirmation email (3.3.3) from the SPDS (3.3). Upon receipt of the email, if and as allowed or required by the Issuer or Debit Network, the cardholder may optionally log into the web-based account (3.0.3) with their previously issued secret user id and password.

(xvii) After login is complete, the cardholder is presented with a list of all approved but outstanding PIN-Debit purchases waiting for secondary approval. At this point, the cardholder can approve or cancel any or all purchases within a specified time frame.

(xviii) Depending on Debit Network Configuration, Issuer Settings and cardholder preferences, transactions may auto approve (or auto decline) within an established time window.

(xix) For approved purchases, the Merchant receives a notification of the approval. This secondary notification (3.3.4) is consistent with the two-step process currently in place for credit card and Signature Debit transactions where settlement typically occurs the next day after transaction approval.

(xx) For cardholder-cancelled or rule-cancelled purchases, a reversal transaction is generated by the SPDS and sent to the Debit Network. The payment is reversed by the issuer and the Merchant does not receive the secondary "settlement record".

There are pros and cons related to each above method discussed related to the Mobile PIN Number. For example, the method of using text messages and Mobile PIN Numbers as a basis to approve payments introduces a risk related to the disclosure of the unencrypted Mobile PIN Number over the wireless network. In order to provide additional protection for the cardholder's Mobile PIN Number from accidental or malicious disclosure, a number of encryption methods may be used on the mobile device. However, the use of encryption on the mobile device has the disadvantage that it will likely require the cardholder to download an encryption application which is supported and certified on mobile device. Some mobile devices may not support this application or download, thus limiting the widespread adoption of this method. Therefore compensating controls which are reflected in the overall method should be considered carefully in whole in securing the PIN Debit transactions.

For example, the use of a mobile phone in conjunction with a cardholder's Mobile PIN Number represents a basis for dual-factor authentication (e.g. something that the cardholder possesses and something that the cardholder knows). However, it may still be possible for fraud to occur using this method. Should the cardholder's mobile phone fall into the wrong hands and should the Mobile PIN Number also be disclosed, a fraudulent payment could conceivably be initiated and approved. However, the overall layered-control framework of the method described herein provides sufficient compensating controls to either prevent or detect this type of fraud. For example, particularly for fungible goods, the ship-to address would not be known and the transaction would not likely pass typical address verification (AVS) controls.

Furthermore, the rules in place at the SPDS pertaining to the use of the cardholder's PAN will likely detect, flag, or prevent certain transactions. Finally, when the cardholder has the option of logging in to the SPDS and approving or declining all PIN Debit internet transactions, it makes such a fraud much more difficult by a introducing an effective "Tri-factor" layer of control for authentication.

However, in recognition of the concern addressed regarding the potential vulnerability of the current method, we would introduce another optional security control in the form of a biometric factor. The biometric may include a voice print, finger print, geometrical facial scan or other factor which can prove that the cardholder is engaged in the payment process. Depending on the implementation method, the biometric factor may be validated either at the mobile device or a host system. However, like encryption, the ability to implement a biometric-based control will vary widely between mobile devices and implementation methods and will therefore be limited based on the cardholder's mobile device.

The processing of unencrypted cardholder Mobile PIN Numbers from registered mobile phones over time will open the door to the harvesting and eventual disclosure of the Mobile PIN Number to hackers. The disclosed Mobile PIN Numbers in combination with the Debit Card PAN and mobile phone will allow for potential fraud. We previously discussed the use of encryption as a method to protect the Mobile PIN Number from accidental or malicious disclosure. As an alternative to Mobile PIN Number encryption, the Mobile PIN Number would be used only to approve the transaction on the mobile phone and would never be transmitted over the wireless network. In lieu of transmitting the Mobile PIN Number, the mobile phone would transmit a secure token to signify that the cardholder has approved the payment transaction. This secure token would be issued to the cardholder for use on the registered handset and would likely be validated by an independent, third-party token validation service (such as VeriSign). Similar to the deployment issues related to encryption and biometrics, the ability to implement certificate or token-based controls will vary widely between mobile devices and implementation will therefore be limited based on the cardholder's mobile device.

It is thus an advantage of the present invention to provide a method for widespread acceptance of the PIN-Debit payment method without exposing the cardholder's Physical PIN number to disclosure. The following list identifies some of the features and benefits associated with the exemplary embodiments of the invention described herein:

(i) Cardholder PAN is used with no need to issue special internet PAN or one-time PAN
(ii) A Mobile PIN limits fraud and does not expose the Physical PIN
(iii) Mobile phone becomes the basis for dual-factor authentication (something the cardholder has (mobile phone) and something the cardholder knows (PIN))
(iv) Low impact on the Merchant, Gateway, Debit Network, Issuer Internet Acquirer
(v) Only adds one additional step in the process to validate transaction before routing to Debit Network and Issuer
(vi) Minimal or no change for issuer authentication process
(vii) Minimal change to merchant because in a typical eCommerce transaction, the merchant already waits for a settlement record to ship products, particularly for fungible products
(viii) Cardholders may set fraud controls for PIN Debit Card usage on eCommerce transactions.
(ix) Cardholders go to a trusted, Issuer branded web site to register cards and configure card preferences and controls in accordance with Issuer and Debit Network tolerances.
(x) Leverages AVS and other common internet security controls (velocity checking, IP, CVV etc.) for PIN Debit.
(xi) Provides online merchants with industry standard functionality and fraud controls.

Many of the above described methods and controls may be used separately or in unique combinations to achieve the desired security level for PIN-Debit eCommerce transactions. Embodiments of the present invention are also described further below by way of illustration.

Figure 4:
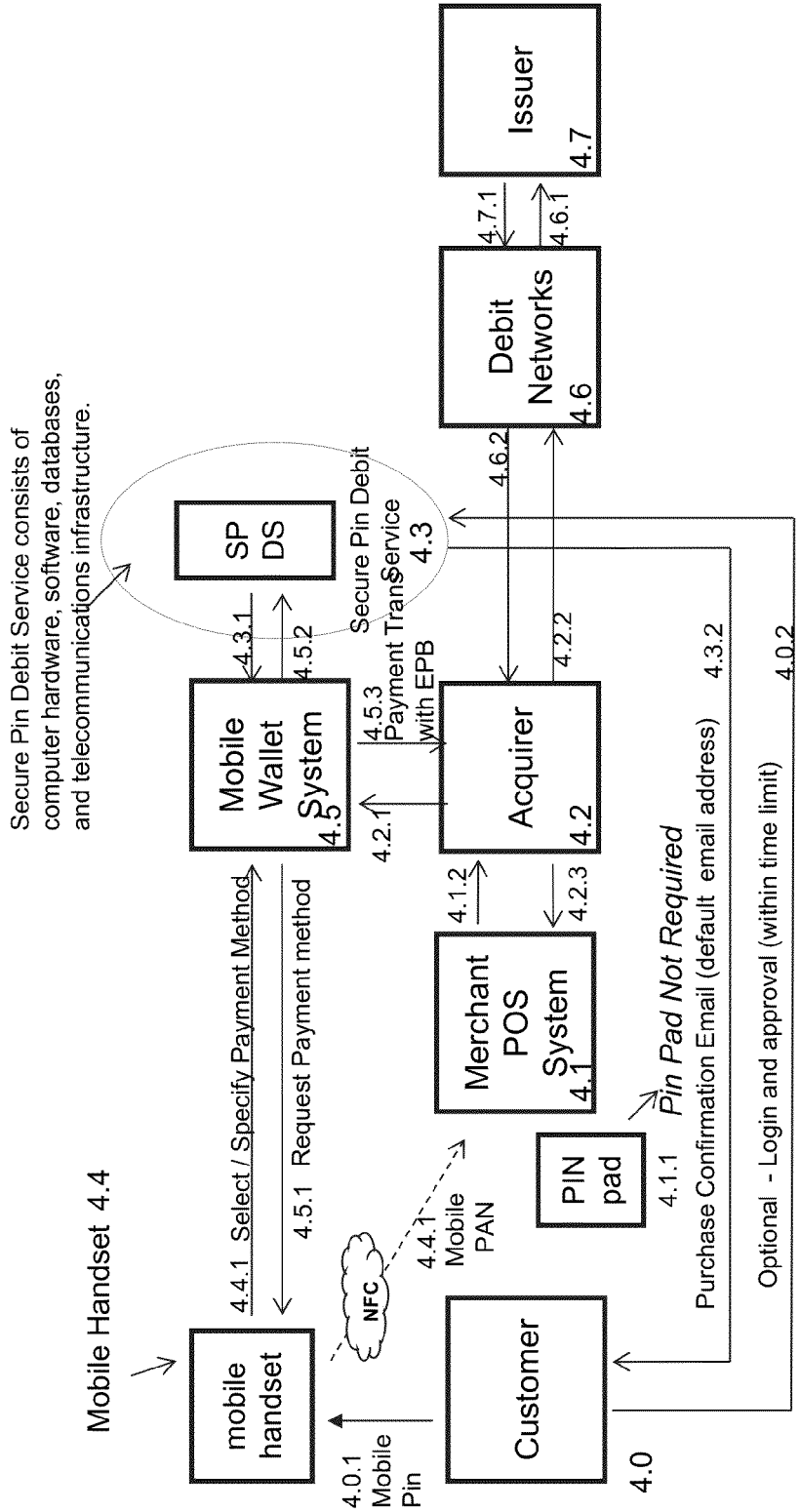
FIG. 4 illustrates a point-of-sale transaction in accordance with an exemplary embodiment of the invention.

The methods described herein for internet PIN-Debit transactions may also be used for Mobile Wallet payment transactions with minor changes to the described process. For example, as shown in the exemplary embodiment illustrated in FIG. 4:

(i) A cardholder (4.0) makes a purchase at a merchant's place of business, such as a retail store.
(ii) The Merchant POS System (4.1) or terminal is configured to detect the Cardholder's Mobile PAN (4.4.1) using Near Field Communications (NFC) or RFID based communications.
(iii) The Merchant POS System formats the payment transaction and forwards the transaction (4.1.2) along with the Mobile PAN to the Acquirer (4.2).
(iv) The Acquirer routes the transaction with Mobile PAN (4.2.1) to the Mobile Wallet System (4.5). Elements of the Mobile Wallet System may be located on the PDA, mobile phone or on a remote server which is accessed by the PDA or mobile phone. The Mobile Wallet System may physically co-located within the SPDS (4.3) or it may be co-located at the Acquirer (4.2) or at the facility operated by the Mobile Network Operator (e.g. AT&T, Verizon, Sprint, etc.) The Mobile Wallet System (4.5) sends the Cardholder a message (4.5.1) requesting the Cardholder to specify a payment method for this purchase.
(v) The Cardholder selects a payment method from the previously registered payment instruments, enters the Mobile PIN Number (4.0.1) and submits transaction (4.4.1) to the Mobile Wallet System (4.5).
(vi) If a PIN Debit Card is selected, the Mobile Wallet System (4.5) replaces the Mobile PAN with the valid Cardholder PAN and forwards the payment transaction (4.5.2) along with the Mobile PIN Number to the SPDS (4.3) for processing.
(vii) The SPDS validates the Mobile PIN Number against the registered Mobile PIN Number for this Debit Card PAN and augments the payment transaction with the Physical PIN number in the Encrypted PIN Block. [In this embodiment, the Physical PIN Number replaces the Mobile PIN Number during this step. In other embodiments, the Physical PIN number may be added to the payment transaction as an additional data element and without replacing the Mobile PIN number. The augmented payment transaction with Encrypted PIN Block (4.3.1) is sent back to the Mobile Wallet System (4.5)
(viii) The Mobile Wallet System (4.5) forwards the payment transaction with Encrypted PIN Block (4.5.3) to the Acquirer.
(ix) The Acquirer (4.2) routes the payment transaction with Encrypted PIN Block (4.2.2) to the appropriate Debit Network (4.6)
(x) From this point in processing the transaction follows normal payment processing flows for POS PIN Debit transactions with little or no changes required by the Debit Networks or Issuers.
(xi) It is thus an advantage of the above method to facilitate the widespread use of PIN Debit payments from Mobile Wallet Systems without the need for significant changes to backend processes handled by the Debit Network (4.6) or the issuer (4.7). Other approaches to implementing the present invention and variations of the described embodiments may be constructed by a skilled practitioner and are considered within the scope of the present invention.

Embodiments of the current invention may be further explained in the exemplary embodiments illustrated in FIGS. 11, 12, 13, 14 and 15.

Figure 11:
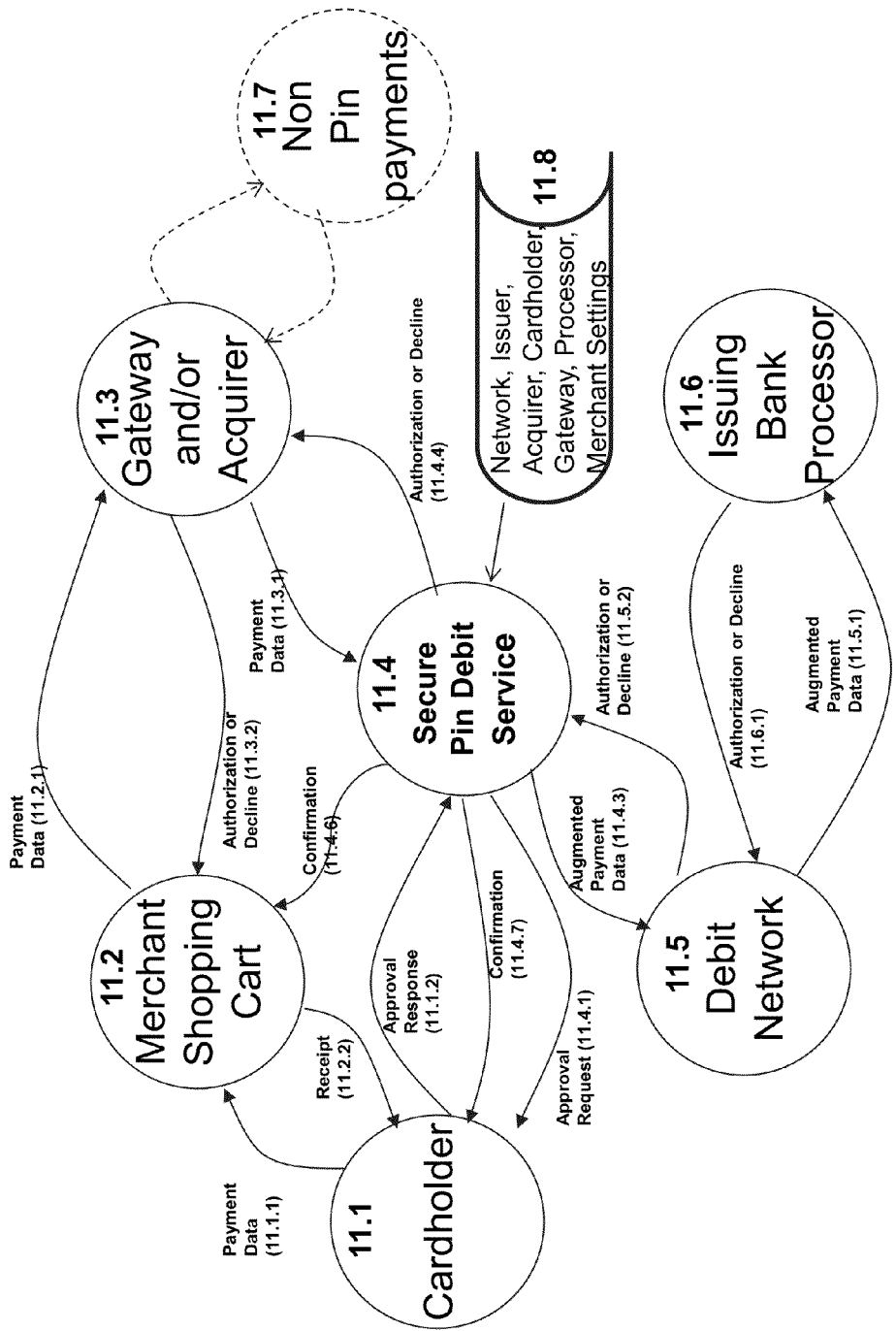
FIG. 11 illustrates the data flow for an eCommerce transaction in accordance with an exemplary embodiment of the invention.

FIG. 11 depicts the Secure PIN Debit transaction data flow diagram. Embodiments are described as shown:
   (i) The Cardholder (11.1) enters Payment Data (11.1.1) to the Merchant Shopping Cart (11.2). Payment Data (11.1.1) typically includes: Customer Name, Customer Address, Cardholder Name, Cardholder Address, Card PAN, CVV2, Expiration Date, email address, and other fields necessary to uniquely identify the cardholder.
   (ii) The Merchant Shopping Cart formats a payment transaction and forwards the Payment Data (11.2.1) to the Gateway or Acquirer (11.3). The Merchant ID and Terminal ID may be included in the payment transaction to uniquely identify the Merchant. The Gateway or Acquirer performs normal processing and validations and routes the Payment Data (11.3.1) for PIN Debit transactions to the Secure PIN Debit Service (SPDS). Transactions that do not represent PIN-debit transactions, such as signature debit and credit card transactions, are routed to element (11.7).
   (iii) The SPDS (11.4) processes the PIN Debit transaction in accordance with all previously established Settings (11.8). For example:
      i. The SPDS prompts the Cardholder with message (11.4.1) to approve the transactions.
      ii. The Cardholder approves the transaction with message (11.1.2)
   (iv) The SPDS augments the payment transaction to conform to ISO 8583 POS transaction standards for POS PIN Debit Transactions primarily through the inclusion of the Encrypted PIN Block. Augmented Payment Data (11.4.3) is forwarded to the appropriate Debit Network (11.5) for normal processing. In connection with this processing, the Debit Network applies fraud rules to the transaction and logs the transaction for billing, settlement processing, customer service and reporting purposes.
   (v) The Debit Network (11.5) routes the Augmented Payment Data (11.5.1) to the Issuing Bank Processor (11.6) where the transaction is approved or declined based on current capabilities and methods with little or no change.
   (vi) The Issuing Bank Processor (11.6) forwards the Authorization or Decline message (11.6.1) to the Debit Network (11.5).
   (vii) From this point the transaction follows a reverse path back to the merchant and an authorization or decline message is provided to the merchant. If authorized, the purchase can be completed and the cardholder is given a receipt (11.2.2).
   (viii) For completed purchases, the Merchant Shopping Cart (11.2) receives confirmation (11.4.6) and the cardholder (11.1) receives confirmation (11.4.7).

Figure 12:
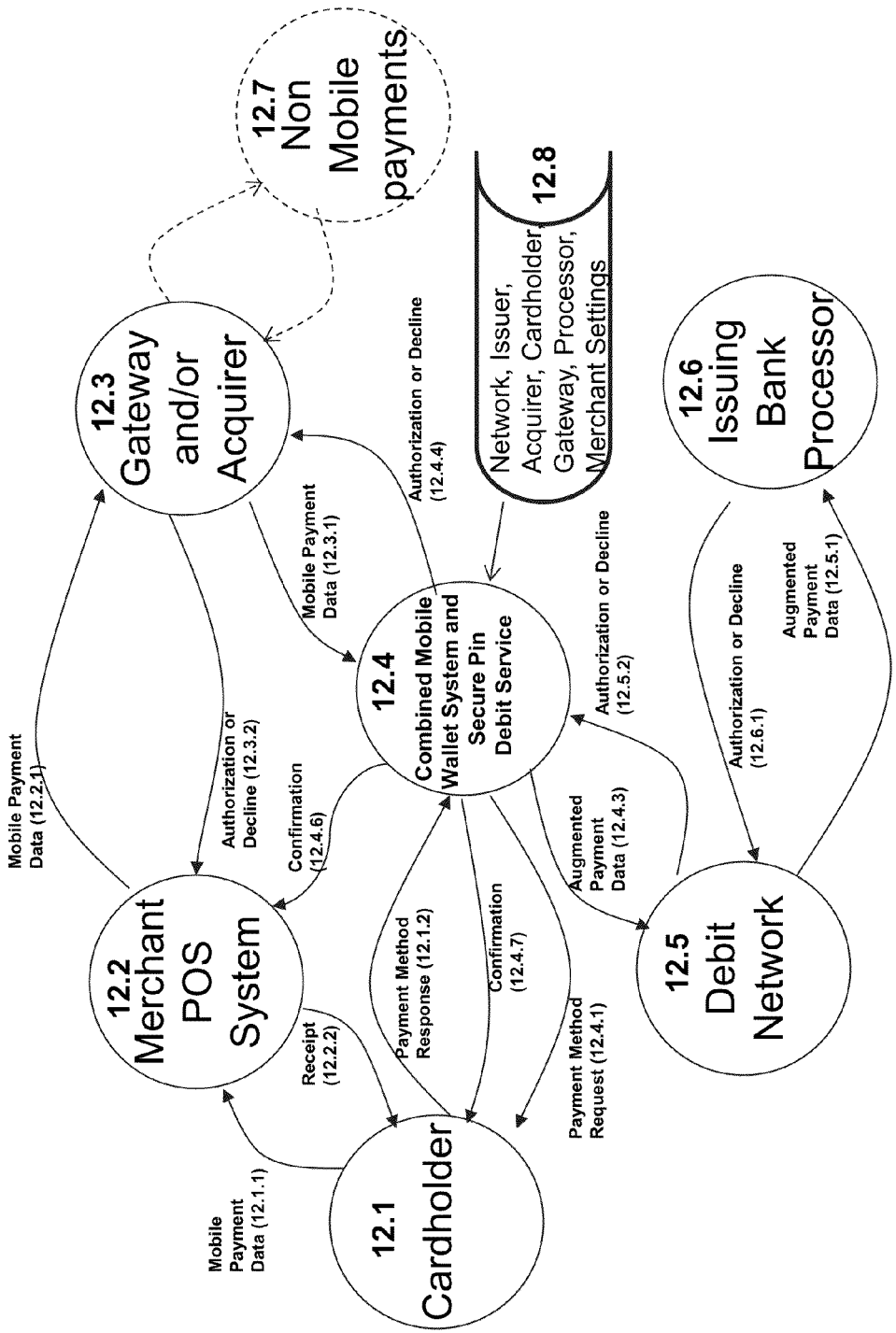
FIG. 12 illustrates the data flow for a point-of-sale transaction in accordance with an exemplary embodiment of the invention.

FIG. 12 depicts an Alternate data flow diagram for a Mobile Secure PIN Debit Transaction whereby the Mobile Wallet System and Secure PIN Debit Service are combined into a single process (12.4). In this exemplary embodiment, element (12.4) sends Payment Method Request (12.4.1) to Cardholder (12.1) and Cardholder (12.1) replies with Payment Method Response (12.1.2) Otherwise, FIG. 12 follows a similar method to that described for FIG. 11. However, FIG. 12 is also intended to illustrate that changes in the process flow may be implemented in various ways by practitioners who are skilled in the art without deviating from the spirit of the invention. Specifically, processes may be combined and split to accommodate the needs of the stakeholders and market driven factors.

Figure 13:
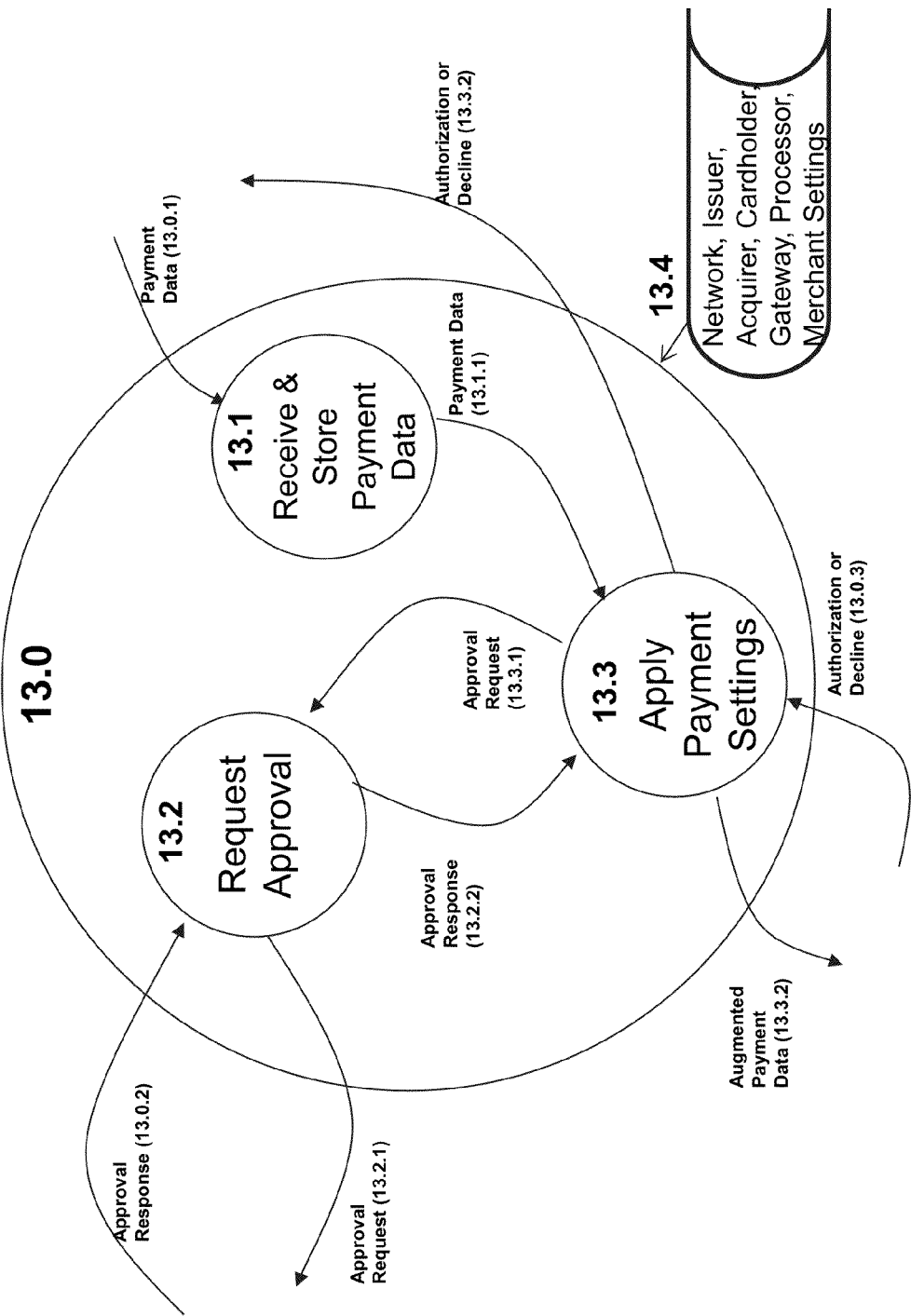
FIG. 13 illustrates in greater detail the data flow for an eCommerce transaction in accordance with an exemplary embodiment of the invention.

Exemplary FIG. 13 is an expanded view of element 11.4 of FIG. 11. As shown:
   (i) Payment Data (13.0.1) is received and stored by Process (13.1).
   (ii) Process (13.1) forwards the Payment Data (13.1.1) to Apply Payment Settings (13.3).
   (iii) Apply Payment Settings (13.3) uses Configuration Settings (13.4) to process payments in accordance with Network, Merchant, Acquirer, Issuer, Gateway, Processor, and Cardholder preferences as described in connection with FIGS. 5-10.
   (iv) Apply Payment Settings sends Approval Request message (13.3.1) to Request Approval (13.2).
   (v) Request Approval (13.2) sends Approval Request message (13.2.1) and receives Approval Response (13.0.2) and forwards Approval Response (13.3.2) to Apply Payment Settings (13.3).
   (vi) Based on the contents of Approval Response message (13.3.2), Apply Payment Settings (13.3) augments the payment data in accordance with settings and forwards Augmented Payment Data (13.3.2) and receives Authorization or Decline message (13.0.3).

Figure 14:
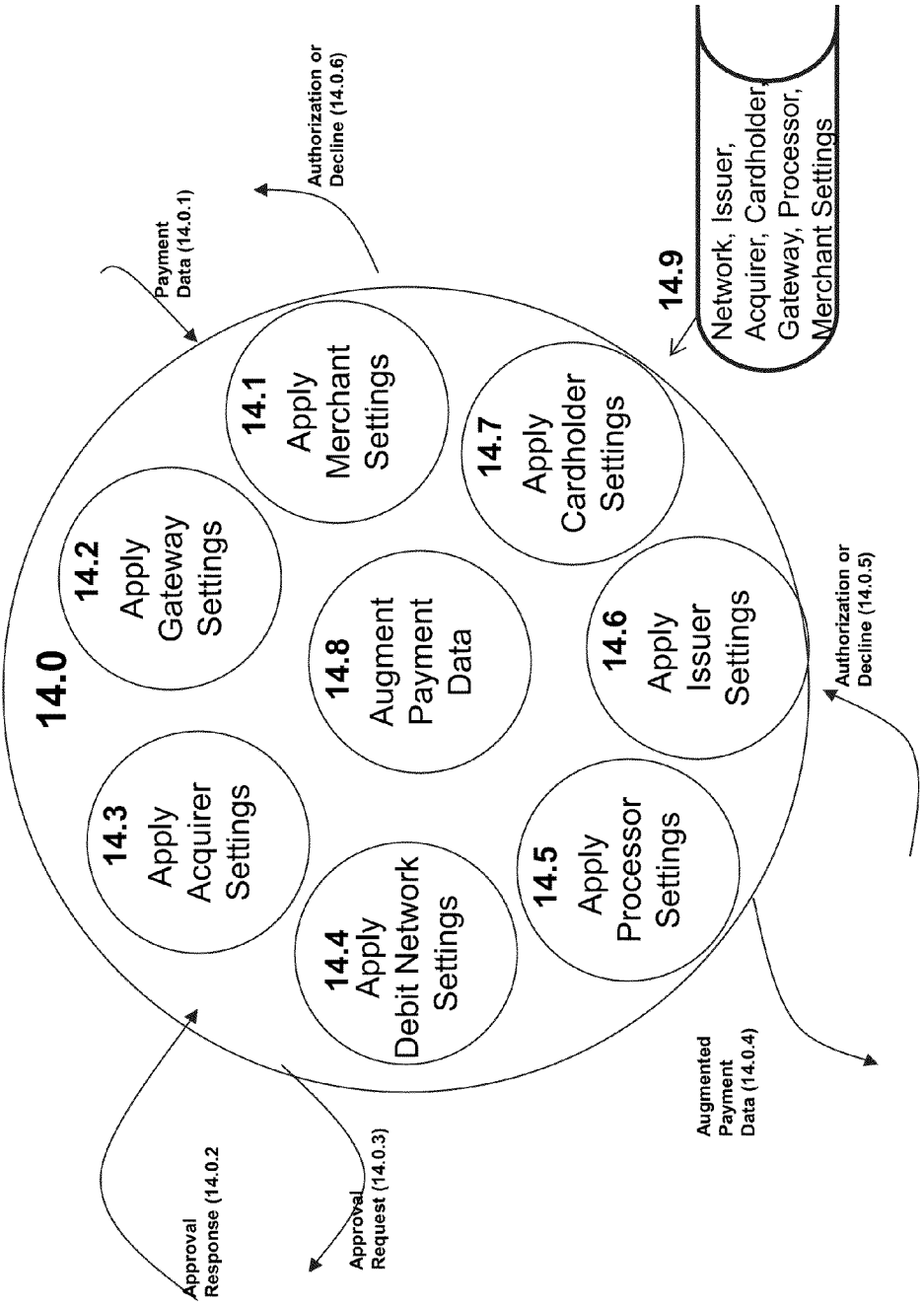
FIG. 14 illustrates in greater detail the processing of payments using configuration settings for an eCommerce transaction in accordance with an exemplary embodiment of the invention.

Exemplary FIG. 14 is an expanded view of FIG. 13.3 which shows the primary payment processing settings that will be applied by the SPDS. The order in which these rules are executed will vary depending on the payment transaction and combination of settings. Steps which will be followed for each transaction include:
   (i) Apply Merchant Settings (14.1)
   (ii) Apply Gateway Settings (14.2)
   (iii) Apply Acquirer Settings (14.3)
   (iv) Apply Debit Network Settings (14.4)
   (v) Apply Processor Settings (14.5)
   (vi) Apply Issuer Settings (14.6)
   (vii) Apply Cardholder Settings (14.7)
   (viii) Augment Payment Data (14.8)

Figure 15:
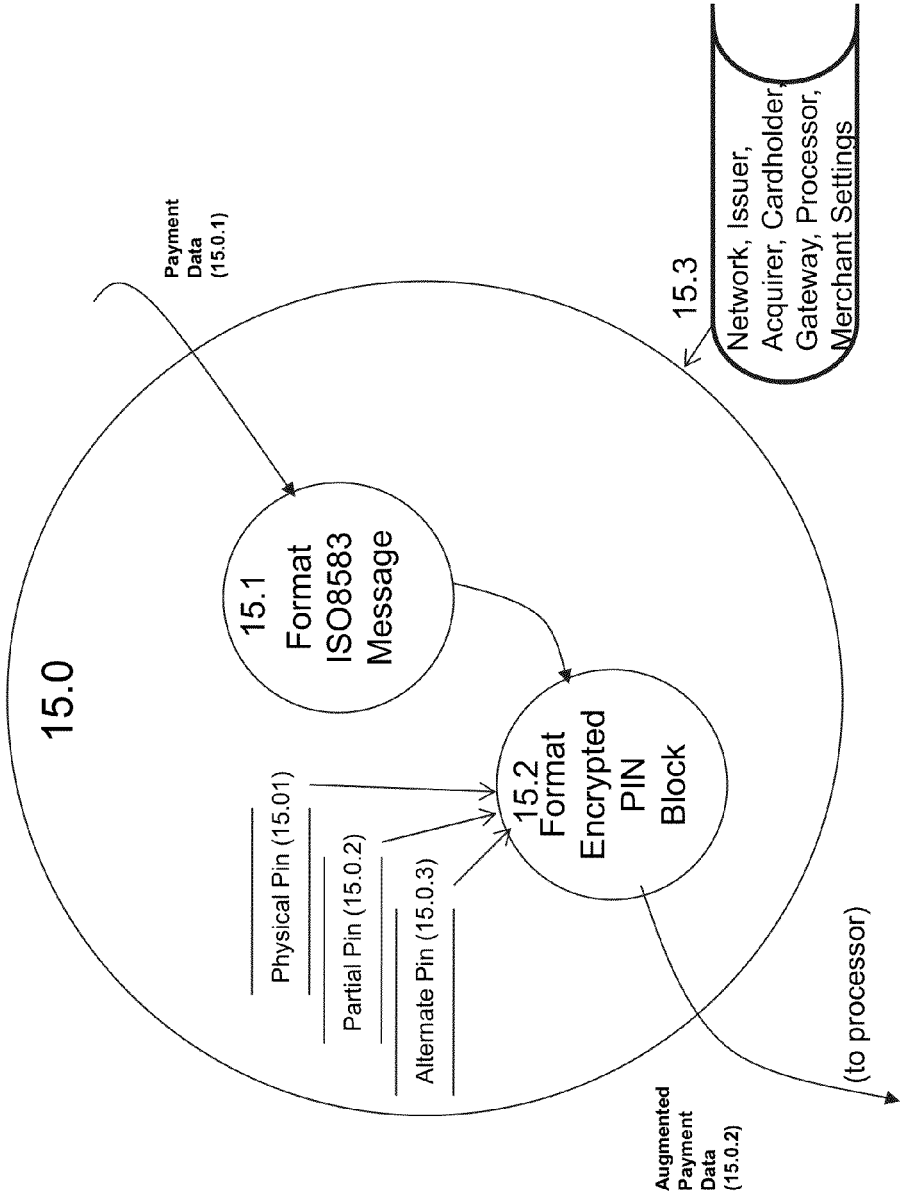
FIG. 15 illustrates in greater detail the augmenting of payment data for an eCommerce transaction in accordance with an exemplary embodiment of the invention.

FIG. 15 is an expanded view of FIG. 14.8 Augment Payment Data Flow Diagram and is specifically focused on augmentation aspects related to the Physical PIN and Encrypted PIN Block. As shown:
   (i) Payment Data (15.0.1) is received by Format ISO 8583 Message (15.1). This process (15.1) formats the message in accordance with the specific requirements of the Debit Network and Processor.
   (ii) Based on settings in place, process (15.2) inserts the cardholder's Physical PIN (15.0.1), Partial PIN (15.0.2) or an Alternate PIN (15.0.3) number into the Encrypted PIN Block of the ISO 8583 payment transaction and forwards the Augmented PIN Data (15.0.2) for further processing.

Figure 16:
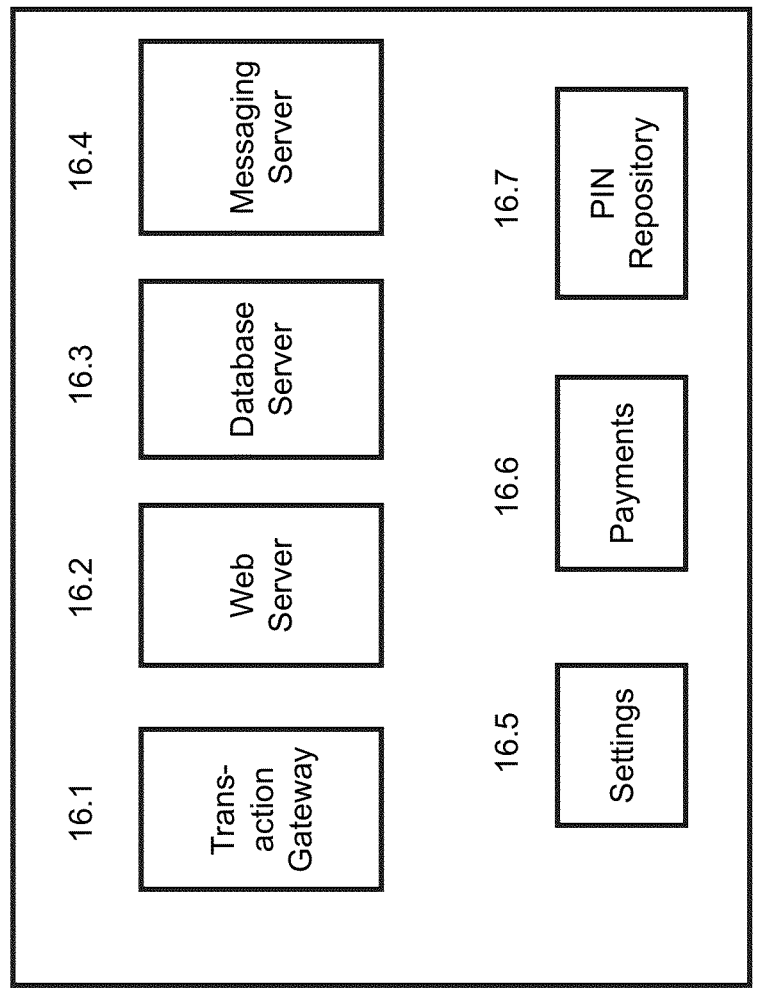
FIG. 16 illustrates in greater detail the primary components of the secure PIN Debit computing device in accordance with an exemplary embodiment of the invention.

Exemplary FIG. 16 is a more detailed description of the primary elements of the Secure PIN Debit Computing Device. Primary elements are described as follows:
   (i) Transaction Gateway (16.1)—Comprises a computing system that contains at least the following primary embodiments (RAM, ROM, CPU, Operating System, BIOS, System BUS, Video Adaptor, Network Interface). The Transaction Gateway is responsible for receiving and processing payment transactions.
   (ii) Web Server (16.2)—Comprises a computing system that contains at least the following primary embodiments (RAM, ROM, CPU, Operating System, BIOS, System BUS, Video Adaptor, Network Interface). The web server is responsible for receiving and processing messages received from internet sources.

(iii) Database Server (16.3)—Comprises a computing system that contains at least the following primary embodiments (RAM, ROM, CPU, Operating System, BIOS, System BUS, Video Adaptor, Network Interface). This server serves the function of controlling the flow of inquiry and updates to system databases.

(iv) Messaging Server (16.4)—Comprises a computing system that contains at least the following primary embodiments (RAM, ROM, CPU, Operating System, BIOS, System BUS, Video Adaptor, Network Interface). This server serves the function of communicating with registered mobile phones and PDAs.

(v) Settings Database (16.5)—Comprises a data storage medium used for the purpose of storing Merchant, Issuer, Debit Network, Consumer, Acquirer, and Gateway settings.

(vi) Payments Transactions (16.6)—Comprises a data storage device used for storing each payment transaction that is processed by the SPDS.

(vii) PIN Repository (16.7)—Comprises a data storage device used to store the Physical PIN, Alternate PIN, or Partial PIN related to registered PIN Debit Card PANs.

Figure 17:
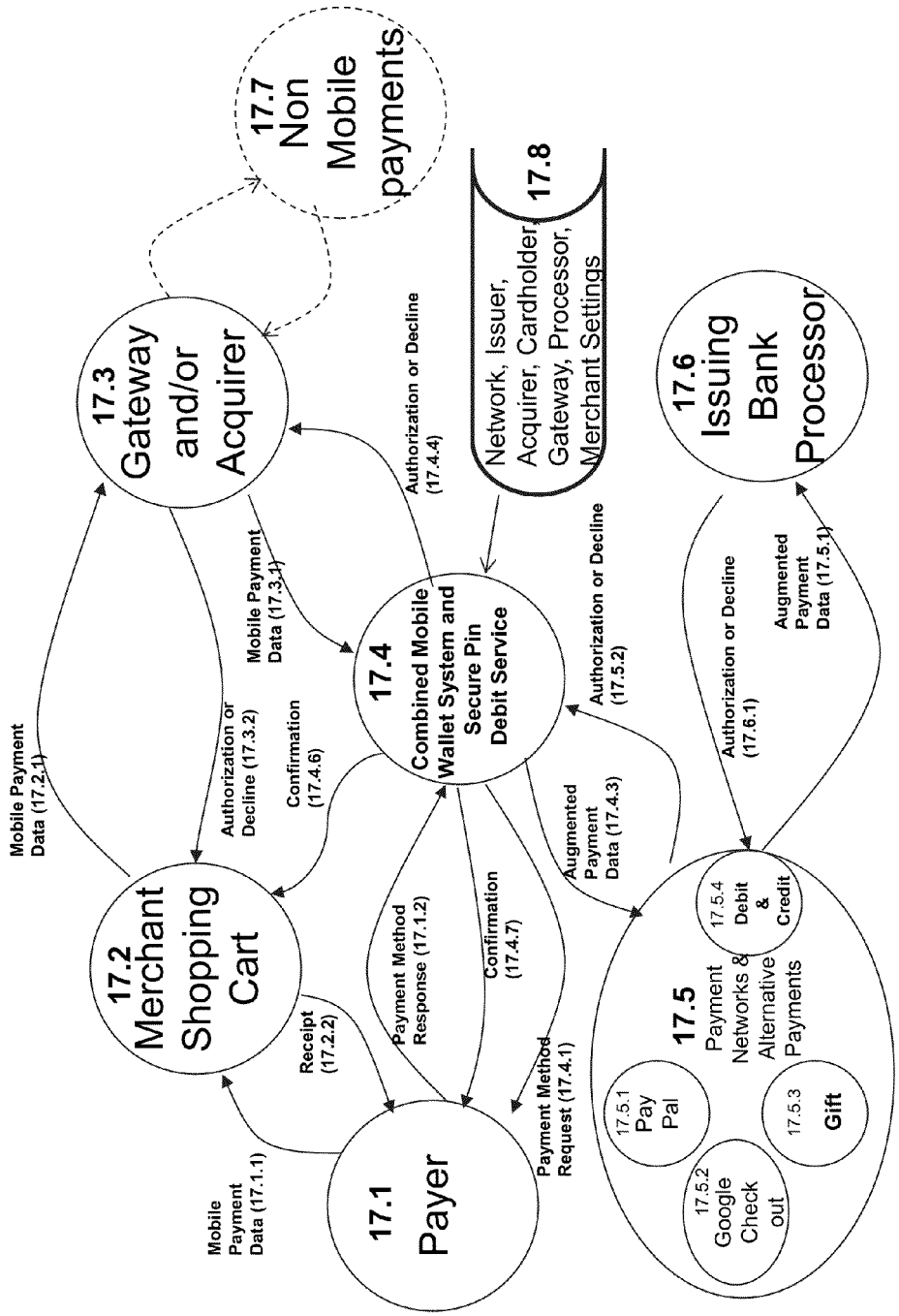
FIG. 17 illustrates the data flow for a internet transaction in accordance with an exemplary embodiment of the invention.

FIG. 17 depicts an alternate data flow diagram for a Mobile Internet Payment Transaction whereby the combined Mobile Wallet System and Secure PIN Debit Service (17.4) can process credit card payment transactions, PIN-Debit payments, and alternative payment transactions from purchases made at internet Merchant Shopping Carts (17.2). In this exemplary embodiment, Payer (17.1) provides mobile payment data (17.1.1) to Merchant Shopping Cart (17.2). Mobile payment data (17.1.1) may be manually keyed into the Merchant Shopping Cart or it may be electronically transmitted from a mobile phone to the Merchant Shopping Cart (17.2). In this exemplary embodiment, it is important to note that element (17.5) includes additional payment methods such as: PayPal (17.5.1), Google Checkout (17.5.2), Gift Cards (17.5.3), and Credit Cards. Otherwise, FIG. 17 follows a similar method to that described for FIG. 11. However, FIG. 17 is also intended to illustrate that changes in the process flow may be implemented in various ways by practitioners who are skilled in the art without deviating from the spirit of the invention. Specifically, new alternative payment methods may be added which do not require Issuing Bank approval and may not utilize conventional payment processing message formats such as the ISO 8583.

Although the exemplary embodiments herein are generally described in the context of software modules running on a computing device, those skilled in the art will recognize that the present invention also can be implemented in conjunction with other program modules in other types of computing environments. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description of the exemplary embodiments includes processes and symbolic representations of operations by conventional computer components, including processing units, memory storage devices, display devices and input devices. These processes and symbolic representations are the means used by those skilled in the art of computer programming and computer construction to most effectively convey teachings and discoveries to others skilled in the art. These processes and operations may utilize conventional computer components in a distributed computing environment, including remote file servers, remote computer servers, and remote memory storage devices. Each of these conventional distributed computing components is accessible by a processing unit via a communications network.

The present invention includes computer hardware and software which embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer hardware and software will be explained in more detail in the following description in conjunction with the other figures in the application.

Figure 18:
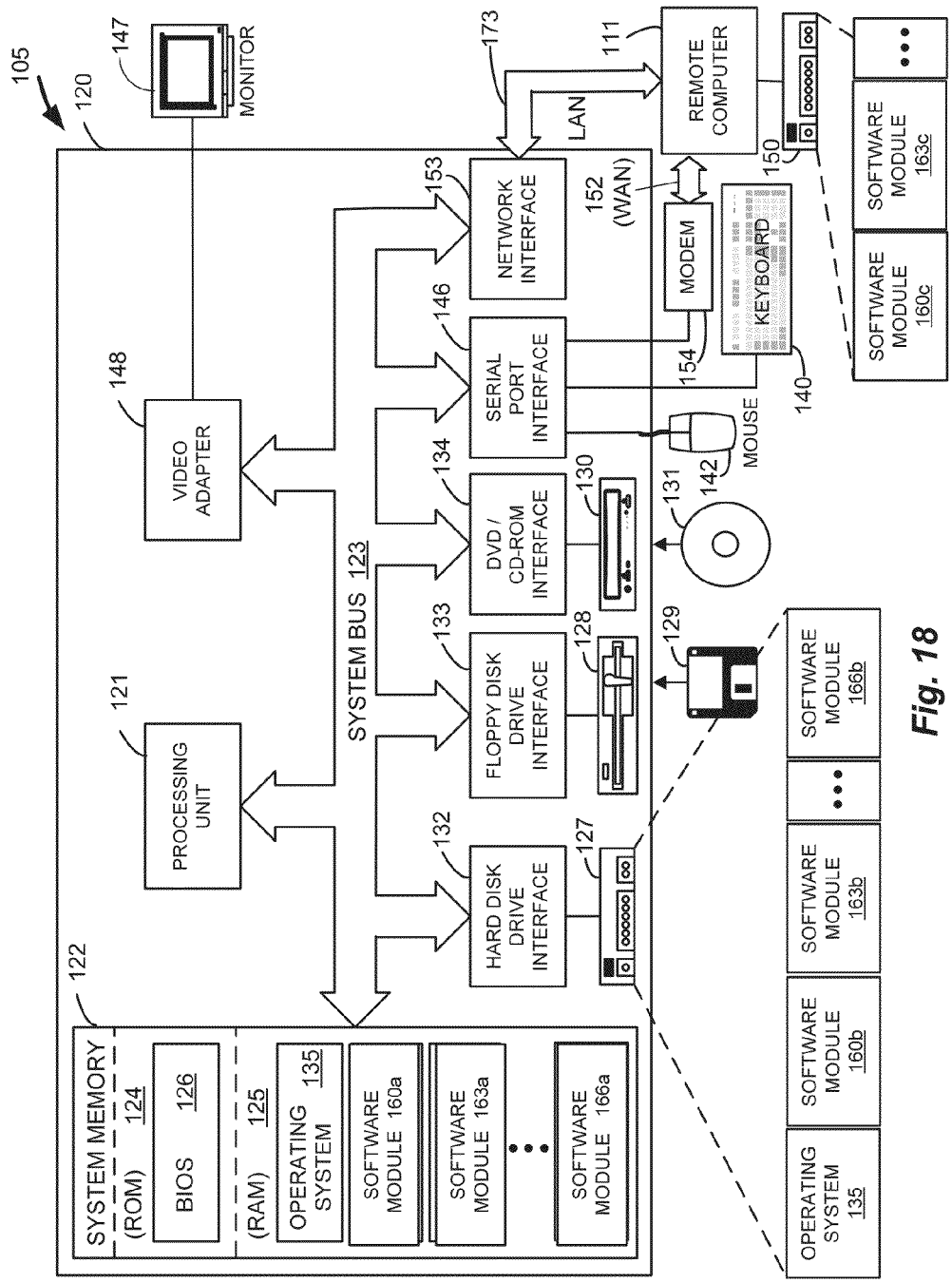
FIG. 18 illustrates an architecture for a computing device in accordance with an exemplary embodiment of the invention.

Referring now to FIG. 18, aspects of an exemplary computing environment in which the present invention can operate are illustrated. Those skilled in the art will appreciate that FIG. 18 and the associated discussion are intended to provide a brief, general description of the preferred computer hardware and program modules, and that additional information is readily available in the appropriate programming manuals, user's guides, and similar publications.

FIG. 18 illustrates a conventional computing device 120 suitable for supporting the operation of the preferred embodiment of the present invention. As illustrated previously in FIG. 16, the secure PIN debit computing device typically comprises multiple computing devices. In FIG. 18, the computing device 120 operates in a networked environment with logical connections to one or more remote computers 111. The logical connections between computing device 120 and remote computer 111 are represented by a local area network 173 and a wide area network 152. Those of ordinary skill in the art will recognize that in this client/server configuration, the remote computer 111 may function as a file server or computer server.

The computing device 120 includes a processing unit 121, such as "PENTIUM" microprocessors manufactured by Intel Corporation of Santa Clara, Calif. The computing device 120 also includes system memory 122, including read only memory (ROM) 124 and random access memory (RAM) 125, which is connected to the processor 121 by a system bus 123. The preferred computing device 120 utilizes a BIOS 126, which is stored in ROM 124. Those skilled in the art will recognize that the BIOS 126 is a set of basic routines that helps to transfer information between elements within the computing device 120. Those skilled in the art will also appreciate that the present invention may be implemented on computers having other architectures, such as computers that do not use a BIOS, and those that utilize other microprocessors.

Within the computing device 120, a local hard disk drive 127 is connected to the system bus 123 via a hard disk drive interface 132. A floppy disk drive 128, which is used to read or write a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134. A user enters commands and information into the computing device 120 by using input devices, such as a keyboard 140 and/or pointing device, such as a mouse 142, which are connected to the system bus 123 via a serial port interface 146. Other types of pointing devices (not shown in FIG. 18) include track pads, track balls, pens, head trackers, data gloves and other devices suitable for positioning a cursor on a computer monitor 147. The monitor 147 or other kind of display device is connected to the system bus 123 via a video adapter 148.

The remote computer 111 in this networked environment is connected to a remote memory storage device 150. This remote memory storage device 150 is typically a large capacity device such as a hard disk drive, CD-ROM or DVD drive, magneto-optical drive or the like. Those skilled in the art will understand that software modules are provided to the remote computer 111 via computer-readable media. The computing device 120 is connected to the remote computer by a network interface 153, which is used to communicate over the local area network 173.

In an alternative embodiment, the computing device 120 is also connected to the remote computer 111 by a modem 154, which is used to communicate over the wide area network 152, such as the Internet. The modem 154 is connected to the system bus 123 via the serial port interface 146. The modem 154 also can be connected to the public switched telephone network (PSTN) or community antenna television (CATV) network. Although illustrated in FIG. 18 as external to the computing device 120, those of ordinary skill in the art can recognize that the modem 154 may also be internal to the computing device 120, thus communicating directly via the system bus 123. Connection to the remote computer 111 via both the local area network 173 and the wide area network 152 is not required, but merely illustrates alternative methods of providing a communication path between the computing device 120 and the remote computer 111.

Although other internal components of the computing device 120 are not shown, those of ordinary skill in the art will appreciate that such components and the interconnection between them are well known. Accordingly, additional details concerning the internal construction of the computing device 120 need not be disclosed in connection with the present invention.

Those skilled in the art will understand that program modules, such as an operating system 135 and other software modules 160a, 163a and 166a, and data are provided to the computing device 120 via computer-readable media. In the preferred computing device, the computer-readable media include the local or remote memory storage devices, which may include the local hard disk drive 132, floppy disk 129, CD-ROM or DVD 131, RAM 125, ROM 124, and the remote memory storage device 150.

We claim:

1. A method for processing a secure payment transaction conducted at a location operated by a merchant comprising the steps of:
    receiving from a consumer in connection with a registration event that is completed prior to the secure payment transaction, a mobile PIN and a card number associated therewith, the mobile PIN and the card number received at a secure payment service computing device;
    in association with the registration event, receiving, at the secure payment service computing device from an issuer bank, an issuer PIN associated with the card number;
    in connection with the secure payment transaction, which is initiated after the registration event, receiving payment data at a payment acquirer computing device, the payment data received from a device at the location operated by the merchant, the payment data comprising the card number;
    in association with the secure payment transaction, analyzing the payment data with the payment acquirer computing device to identify the payment data as requiring the mobile PIN;
    upon identifying the payment data as requiring the mobile PIN, forwarding the payment data from the payment acquirer computing device to the secure payment service computing device, the secure payment service computing device:
        communicating an approval request to a mobile telephone of the consumer;
        after receiving an approval response from the consumer's mobile telephone, the secure payment service computing device adding the issuer PIN to the payment data, and transmitting the payment data and the issuer PIN to a secure payment network for processing; and
        after transmitting the payment data and the issuer PIN to the secure payment network for processing, the secure payment service computing device transmitting a payment confirmation to the merchant.

2. The method of claim 1, wherein the location is one of an ecommerce site or a retail point of sale.

3. The method of claim 1, wherein the card number is associated with one of a credit card, a debit card, or a gift card.

4. The method of claim 1, wherein the secure payment network is one of a debit network, a credit card network, or an alternative payment network.

5. The method of claim 1, wherein the issuer PIN is one of an alternate PIN, a physical PIN, or a partial PIN.

6. The method of claim 5, wherein the partial PIN comprises one of a blank, a zero, or a null value.

7. The method of claim 1, wherein the device at the location operated by the merchant is one of a POS device, a mobile telephone, or a hosting computer.

8. A system for processing a secure payment transaction, the system comprising:
    a rule database, the rule database comprising configuration settings whereby the configuration settings are used to determine the criteria to be used to authorize the secure payment transaction;
    a secure payment service computing device in communication with the rule database and with one or more payment networks, the secure payment service computing device comprising computer-readable instructions that when executed by one or more processors are configured to:
        receive the configuration settings from one or more of a consumer, an issuer entity, a payment network, and a merchant;
        store the configuration settings in the rule database;
        receive from a first consumer in connection with a registration event that is completed prior to the secure payment transaction, a mobile PIN and a first payment account identifier associated therewith, the mobile PIN and the payment account identifier stored in the rule database and associated with the configuration settings;
        in connection with the secure payment transaction, which is initiated after the registration event, receive payment data at the secure payment service computing device, the payment data received from a first merchant, the payment data comprising the first payment account identifier;

analyzing the payment data with the secure payment service computing device to identify the payment data as requiring the mobile PIN;

upon identifying the payment data as requiring the mobile PIN, the secure payment service computing device further configured to:
- communicate an approval request to a mobile telephone of the first consumer;
- after receiving an approval response from the first consumer's mobile telephone, transmitting the payment data to a first payment network for processing; and
- after receiving an approval response from the first payment network, transmitting a payment confirmation to the merchant.

9. The system of claim 8, wherein the payment data received from the first merchant is received from one of a retail point of sale, a mobile telephone, or an ecommerce site.

10. The system of claim 8, wherein the first payment account identifier is associated with one of a credit card, a debit card, or a gift card.

11. The system of claim 8, wherein the first payment network is one of a debit network, a credit card network, or an alternative payment network.

12. The system of claim 8, wherein the approval response is communicated by entry into the first consumer's mobile telephone of a biometric factor of the consumer which is one of a finger print, a voice print, or a geometric facial scan.

13. The system of claim 8, wherein the approval response is transmitted in the form of a token released from the first consumer's mobile telephone to the secure payment service computing device.

* * * * *